(12) United States Patent
Andreasen et al.

(10) Patent No.: US 7,116,216 B2
(45) Date of Patent: Oct. 3, 2006

(54) SERIAL DATA GAUGE

(76) Inventors: Keith Andreasen, 15441 Hanover La., Huntington Beach, CA (US) 93647; David Rich, 422 13th St., Huntington Beach, CA (US) 92648

( * ) Notice: Subject to any disclaimer, the term of this patent is extended or adjusted under 35 U.S.C. 154(b) by 145 days.

(21) Appl. No.: 10/898,422

(22) Filed: Jul. 22, 2004

(65) Prior Publication Data
US 2006/0017552 A1 Jan. 26, 2006

(51) Int. Cl.
*B60Q 1/00* (2006.01)
*G06F 19/00* (2006.01)

(52) U.S. Cl. ............... 340/438; 340/459; 340/461; 701/29; 701/33; 701/24

(58) Field of Classification Search ......... 340/438; 701/24
See application file for complete search history.

(56) References Cited

U.S. PATENT DOCUMENTS

| | | | |
|---|---|---|---|
| 5,003,478 A | | 3/1991 | Kobayashi et al. ........... 701/32 |
| 5,491,631 A | * | 2/1996 | Shirane et al. ............... 701/35 |
| 5,532,927 A | * | 7/1996 | Pink et al. ................... 701/34 |
| 5,541,840 A | | 7/1996 | Gurne et al. ................. 701/33 |
| 5,916,286 A | * | 6/1999 | Seashore et al. ............. 701/29 |
| 6,021,366 A | | 2/2000 | Fieramosca et al. .......... 701/33 |
| 6,225,898 B1 | | 5/2001 | Kamiya et al. ............ 340/505 |
| 6,525,664 B1 | * | 2/2003 | Erland ....................... 340/635 |
| 6,687,584 B1 | | 2/2004 | Andreasen et al. ........... 701/29 |
| 6,701,233 B1 | * | 3/2004 | Namaky et al. .............. 701/33 |
| 2003/0060953 A1 | * | 3/2003 | Chen ......................... 701/33 |
| 2004/0055446 A1 | | 3/2004 | Robbin et al. ............... 84/615 |

OTHER PUBLICATIONS

SAE, Surface Vehicle Recommended Practice (1978), 16 pages.
Toyota Motor Sales, U.S.A., Inc., Serial Data Interpretation, 12 pages, Jul. 2004.
Toyota Motor Sales, U.S.A., Inc., Serial Data, 9 pages, Jul. 2004.
Toyota Motor Sales, U.S.A., Inc., Overview of OBD and Regulations, 11 pages, Jul. 2004.
SAE, E/E Diagnostic Test Modes (1979), pp. 29-42.
ISO, Road Vehicles-Diagnosic Systems-Keyword Protocol 2000-Physical Layer (1999), 12 pages.
SAE, International Surface Vehicle Standard (1979) 159 pages.
ISO, Road Vehicles-Diagnostic Systems-Verification of the communication between vehicle and OBDII scan tool (1998), 24 pages.
Actron, Professional Enhanced Scan Tool Manual (2001), 173 pages.
AutoXray, Ez-Scan Users Manual, 97 pages, Jul. 2004.

* cited by examiner

*Primary Examiner*—Donnie L. Crosland
(74) *Attorney, Agent, or Firm*—Stetina Brunda Garred & Brucker

(57) ABSTRACT

An instrument is provided which is in electronic communication with an on board diagnostic system (OBD) of an automobile. The instrument selectively queries the OBD with batch requests for the purpose of reducing a processing load placed on the OBD PCM. The instrument obtains numerous operating conditions through the OBD, and displays the operating conditions in an intuitive format. The operating conditions may be grouped into five different modes, and the five most relevant operating conditions within each mode may be displayed on the monitor either by default or through customization by the user.

14 Claims, 23 Drawing Sheets

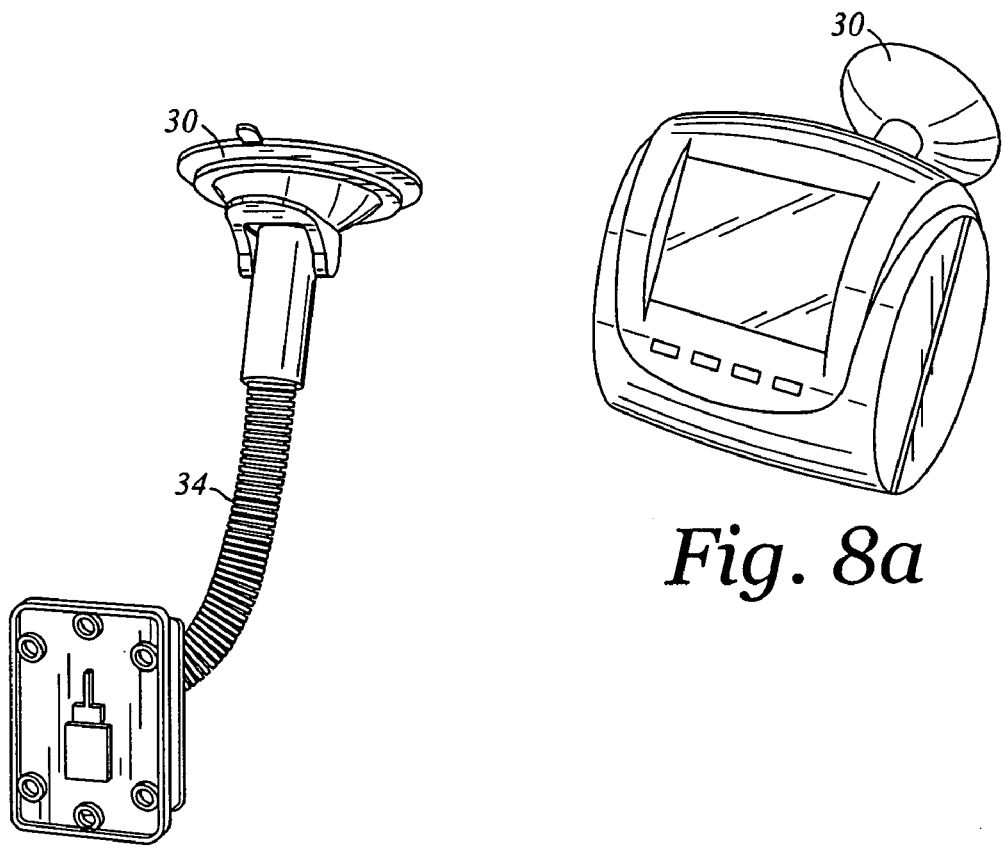
Fig. 8a
Fig. 9
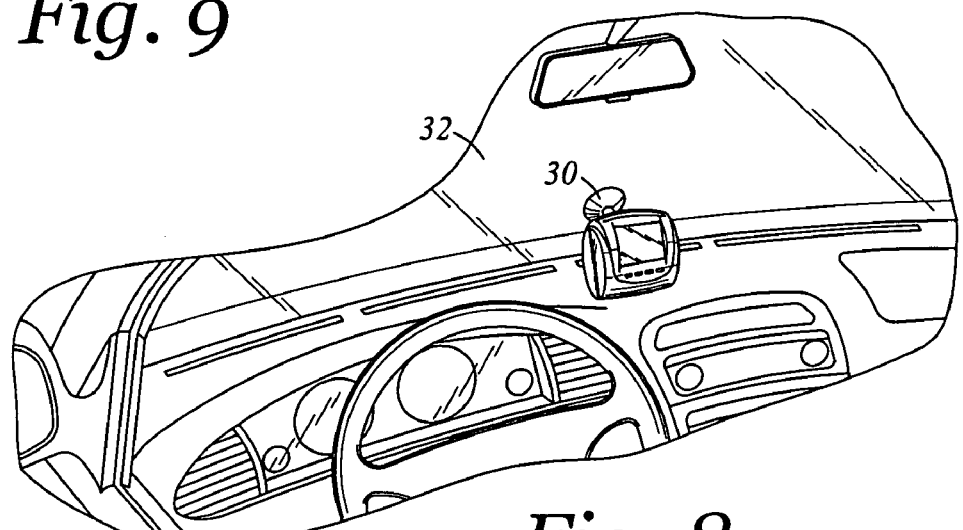
Fig. 8

TOWING

| NO. | PARAMETER | PID | WARNING RANGE | UNITS |
|---|---|---|---|---|
| 1 | ENGINE LOAD | | | % |
| 2 | TORQUE CONVERTER LOCKUP STATUS | | | ON/OFF |
| 3 | ENGINE VACUUM | | | mmHg/inHg |
| 4 | TRANSMISSION TEMPERATURE | | | C°/F° |
| 5 | GEAR POSITION SELECTED vs. ATTAINED | | | 1, 2, 3, etc. |
| 6 | CALCULATED LOAD | | | % |
| 7 | LINE PRESSURE | | | KPa/PSI |
| 8 | TEMPERATURE SLIPPAGE | | | % |
| 9 | EXHAUST GAS TEMPERATURE | | | KPa/PSI |
| 10 | EXHAUST BRAKE PRESSURE | | | KPa/PSI |
| 11 | BOOST PRESSURE | | | KPa/PSI |
| 12 | ALTIMETER | | | KPa/PSI |
| 13 | BAROMETER | | | KPa/PSI |
| 14 | COMPASS/AMBIENT TEMPERATURE | | | N, S, W, E |
| 15 | SETUP | | | |

*Fig. 20a*

8.2.5 PERFORMANCE

| NO. | PARAMETER | PID | WARNING RANGE | UNITS |
|---|---|---|---|---|
| 1 | HORSEPOWER | | | HP |
| 2 | TORQUE | | | FT/LB, ? |
| 3 | 1/8 MILE ELAPSED TIMES | | | SECONDS |
| 4 | 1/4 MILE ELAPSED TIMES | | | SECONDS |
| 5 | 0-60 ELAPSED TIMES | | | SECONDS |
| 6 | ACCELERATION AND G FORCE | | | |
| 7 | BRAKING DISTANCE/TIMES | | | |
| 8 | | | | |

*Fig. 20b*

8.2.2 DIAGNOSTICS

| NO. | PARAMETER | PID | WARNING RANGE | UNITS |
|---|---|---|---|---|
| 1 | CODE NUMBER | | | NUMBERS |
| 2 | OBD II CODES | | | NUMBERS |
| 3 | PENDING CODES | | | % |
| 4 | MIL STATUS | | | |
| 5 | CHARGING SYSTEM/BATTERY VOLTAGE | | | |
| 6 | MONITOR AND I/M STATUS | | | NUMBERS |
| 7 | O2 SENSOR DATA | | | NUMBERS |
| 8 | FUEL SYSTEM | | | % |
| 9 | SETUP | | | BTDC |
| 10 | | | | |
| 11 | | | | |

*Fig. 20c*

8.2.1 GAUGE

| NO. | PARAMETER | PID | WARNING RANGE | UNITS |
|---|---|---|---|---|
| 1 | TACHOMETER | | | RPM |
| 2 | COOLANT TEMPERATURE | | | C°/F° |
| 3 | OIL TEMPERATURE | | | C°/F° |
| 4 | TRANSMISSION TEMPERATURE | | | C°/F° |
| 5 | EXHAUST GAS TEMPERATURE (DIESEL ONLY) | | | C°/F° |
| 6 | EXHAUST BRAKE PRESSURE (DIESEL ONLY) | | | KPa/PSI |
| 7 | BOOST PRESSURE (GAS AND DIESEL) | | | KPa/PSI |
| 8 | INTAKE AIR TEMPERATURE | | | C°/F° |
| 9 | TPS | | | % |
| 10 | FUEL PRESSURE | | | KPa/PSI |
| 11 | OIL PRESSURE | | | KPa/PSI |
| 12 | FUEL TRIM | | | % |
| 13 | BAROMETRIC PRESSURE | | | KPa/PSI |
| 14 | SYSTEM VOLTAGE | | | VOLTS |
| 15 | SETUP | | | |

8.2.3 ECONOMY

| NO. | PARAMETER | PID | WARNING RANGE | UNITS |
|-----|-----------|-----|---------------|-------|
| 1 | FUEL/AVERAGE MPG | | | NUMBERS |
| 2 | RANGE/DISTANCE TILL EMPTY | | | NUMBERS |
| 3 | ENGINE VACUUM/CALCULATED LOAD | | | % |
| 4 | CURRENT MPG | | | NUMBERS |
| 5 | TRIP DISTANCE | | | NUMBERS |
| 6 | FUEL TRIM | | | % |
| 7 | IGNITION TIMING | | | °BTDC |
| 8 | SETUP | | | |
| 9 | | | | |
| 10 | | | | |
| 11 | | | | |

SERIAL DATA GAUGE

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

The present invention relates to a gauge, and more particularly, to a gauge that is easily installable to an automobile through its on board diagnostic system, has a monitor that is removeably attachable to the automobile, and may display numerous operating conditions formatted in an intuitive format which is customizable.

A gauge is standard component on every vehicle sold in the United States. For example, a gauge that is standard on every automobile is a speedometer and an odometer. These gauges are installed by the manufacturer of the automobile at the time of manufacture. Another standard gauge of every automobile is a Fuel level indicator. This gauge also is installed by the manufacturer at the time of manufacture. In other cases, the manufacturer may place temperature or pressure sensor in the engine compartment to determine when the coolant temperature is too high or the oil pressure is dangerously low. For all gauges that are standard with the automobile, the manufacturer may hardwire a sensor for a relevant operating condition of the automobile to be sensed. These gauges are standard in the sense that they are installed in every vehicle regardless of the particular function of the automobile (e.g., towing) or taste of the driver (e.g., performance). For example, an automobile (e.g., heavy duty truck, recreational vehicle, sports utility vehicle, light duty truck, minivans, etc.) may primarily be used for towing and yet the automobile would only be equipped with standard gauges installed by the automobile manufacturer such as a speedometer, rpm gauge, and odometer even though other gauges would be beneficial for safety reasons.

Frequently, many drivers who use their automobiles for towing would add additional gauges to the standard gauges such that the automobile may be safer to drive during towing. For example, they may add gauges for engine vacuum and transmission temperature. Accordingly, these additional gauges must be hard wired to the respective automobile component which may be difficult even for an expert and unattractive. Moreover, as the numbers of additional gauges are installed, the difficulty of the installation increases as well as its unattractiveness because of the need for additional wires and modifications to the vehicle. Simply put, frequently, adding additional gauges above the standard gauges that are installed by the manufacturer is cumbersome and messy, and drivers are hesitant to add additional gauges to the automobile even though it may be safer to do so such as in the towing situation above.

Furthermore, the standard gauges are geared to general use of the automobile, and these gauges are not function specific or suited to a particular taste of a driver. For example, as stated above, the automobile may primarily be used for towing (i.e., function of the automobile) but gauges useful to make the towing automobile safer are not installed by the manufacturer. Rather, only general gauges are installed by the manufacturer such as speedometer, odometer and rpm gauges. In another example, the automobile may be driven by an automobile enthusiast, yet only general gauges are installed on the automobile. In this regard, the driver may desire to have gauges (e.g., elapsed time, torque output and braking distance) related to the performance of the vehicle added to the automobile. Simply put, automobiles are not manufactured according to the "environment" in which the automobile would most probably be used in. Gauges useful during towing are not installed, gauges pertaining to the performance of the automobile are not installed, and etc.

Third party gauges may be installed per the function of the automobile or taste of the driver but frequently drivers desire to install two or more gauges to display the selected operating conditions of the vehicle. This may create a difficult installation and an unattractive interior. Simply put, gauges on the market today are not geared toward the function of the automobile or the taste of the driver. Rather, third party gauges must be selected, combined, mixed and matched to provide a set of gauges suited to the function of the automobile or taste of the driver.

Moreover, the gauges that are typically being sold are fixed and are not customizable per the individual taste of the driver or function of the automobile. As stated above, gauges useful for towing may be different compared to gauges to determine the performance of the automobile. In this regard, the gauges sold today are not customizable such that only operating conditions of the vehicle useful for towing are displayed on a single gauge when the automobile is being used for towing and operating conditions related to the performance of the automobile are displayed on the gauge when the driver desires to display such operating conditions. For example, a third party temperature gauge may only read the temperature of the component to which the gauge is hard wired to such as the coolant temperature. In this regard, the coolant temperature gauge only displays the temperature of the coolant and does not display other operating conditions of the automobile. Simply put, these gauges are not customizable to a particular taste of a driver or function of the automobile.

The customizability of the gauge is especially desirable especially when many vehicles are multi purpose vehicles. For example, a light duty truck may be used for towing a jet ski, and in this regard, operating conditions of the automobile related to towing should be displayed on a gauge; and, simultaneously, the light duty truck may be modified to be a high performance truck, and in this regard, the driver may desire to have operating conditions of the automobile related to performance displayed on the same gauge. In other words, the driver while towing the jet ski would desire to have operating conditions related to towing displayed, and thereafter, after the jet ski is detached from the truck, would desire to have operating conditions of the automobile related to performance displayed on the same gauge.

In sum, first, the gauges in the market are difficult to install, and as the number of gauges installed on the automobile increases, the difficulty of installing the gauges increases as well as the unattractiveness of the installed gauges. In this regard, it would be beneficial to provide a gauge that is easy, quick and clean to install. Moreover, if the gauge is easy to install such that anyone could install it, then drivers who use their automobiles for towing would be more apt to install the gauge, instead of being hesitant to install the gauge because of the difficulty of installing the gauge. In this regard, the streets would become a safer place. Second, the gauges in the market today are not geared to a particular function of the automobile or taste of the driver. Accordingly, it would be beneficial to provide a gauge that is directed toward a particular function of the automobile such as towing or taste of the driver (i.e., driver that is an automobile enthusiast). Third, gauges sold in the market today are not customizable per the function of the automobile nor the taste of the driver. In this regard, it would be beneficial to provide a single gauge that may be customized according to the function of the automobile or the taste of the driver.

BRIEF SUMMARY OF THE INVENTION

The aforementioned disadvantages are overcome by providing a device that may communicate with an on board diagnostic computer of an automobile. In this regard, the present invention includes the device that communicates with the on board diagnostic computer as well as the method of communicating with the on board diagnostic computer.

To fully appreciate the device and the method of the present invention, the on board diagnostic system (i.e., OBD referring to the first generation OBD I or the second generation OBD II) shall be discussed. In particular, the on board diagnostic computer of the automobile is required as mandated by California Air Resources Board (CARB) and the Environmental Protection Agency (EPA). The primary original purpose of the OBD at its inception was for the purpose of lowering emissions. To this end, the OBD has a set of sensors that extend into and are attached to components of the automobile that are related to emissions control. Manufacturers have added additional sensors in addition to those that are required by law as mandated by CARB and EPA for their own purposes. Up to date, the on board diagnostic computer has mainly been used by technicians and mechanics in trouble shooting automobiles. Simply put, the OBD has been used as a diagnostic tool and not for the purposes of supporting a gauge. In this regard, the device of the present invention transforms the OBD from a computer that is used for the purposes of diagnosis by mechanics to a gauge used by drivers of automobiles. Moreover, the present invention includes the method by which the device communicates with the OBD. The identification of the device and method of the present invention discussed above are not meant to limit the scope of the present invention but are merely meant to illustrate two aspects of the present invention. With this general understanding of the OBD, a brief discussion of the device will be followed by a brief discussion of the method by which the device communicates with the OBD.

The gauge which is a subject matter of the present invention based on its appearance may be characterized as a stylish yet simple design, as shown in the Figures. Yet, the gauge is a robust device which is easy to install, transferable, reconfigurable, intuitive, customizable, easy to navigate, helpful and ingenious.

The gauge is easy to install. In particular, the gauge may be connected to an automobile and ready to receive operating conditions (i.e., PID data) about the automobile in a matter of seconds. This is accomplished because the gauge has a connector which is designed to connect with the data link connector of the automobile, or in other words, the DLC. The DLC communicates with the OBD of the automobile. And, in this regard, the gauge may obtain information about the operating conditions/parameters of the vehicle. Simply put, the installation and de-installation of the gauge from the automobile requires a mere attachment or detachment between the connector of the gauge and the DLC.

The gauge, and more particularly, the monitor of the gauge may be fabricated to be removeably attachable to the automobile. For example, the monitor may be removeably attachable to the windshield of the automobile via a suction cup. Or, the monitor may be attached to a cup shaped prong which is receivable into a cup holder of the automobile. In this regard, the monitor itself may be removeably attachable to the automobile.

The quick and easy installation of the gauge with the connector to the DLC in combination with the removeably attachable feature discussed above enables the gauge of the present invention to be transported from automobile to automobile. This transportability or transferability of the gauge between automobiles may be particularly useful in a rental car situation or single driver who owns two different types of vehicle situation. Moreover, the ease by which the gauge may be mounted and placed in communication with the OBD broadens the market for this gauge. In particular, if the gauge requires expert installation, then the gauge as a total package (including installation) becomes more expensive. As such, since the gauge of the present invention may conceivably be installed by a do it yourselfer, the market for the gauge is limited by the number of automobiles on the road. Moreover, the single wire which may connect the gauge to the OBD is not noticeable to detract from the interior's attractiveness. Even this single wire may be eliminated by the use of wireless communication technology between the gauge and the gauge's connector.

The gauge is a multi function gauge. Simply put, the gauge is able to display a plurality of operating conditions (i.e., parameter identification or PID) of the automobile based on the data (i.e., PID info) received from the OBD. Typically, the OBD is not able to provide "streaming" data to a gauge, especially, a multiple function gauge. Nonetheless, to enable the OBD to support the multi functionality of the gauge, the present invention includes also a method by which the gauge communicates with the gauge such that the OBD may support the multi functionality of the gauge. This method transforms the OBD on the automobile from a primarily diagnostic tool to a gauge that has multiple functions and which may be used by a driver while the automobile is being driven. This method will be discussed below.

The multiple operating conditions/parameters (i.e., multifunctional) displayable by the gauge may be shown on the monitor in a unique format. The format may additionally have a unique method of navigating through all of the various operating conditions/parameters displayable on the monitor. Two formats will be discussed.

A first format comprises a series of initiating screens. The initiating screens help the driver or user to determine the appropriate year, make, model and engine size of the automobile to which the gauge is installed. After the initiating screens, the user may be provided with the option of keeping default settings selected by the manufacturer of the gauge, or in the alternative, the user may customize the settings in the gauge. In particular, the gauge is capable of displaying numerous operating conditions/parameters. The operating conditions/parameters may be grouped under specific modes such as gauge mode, diagnostic mode, economy mode, towing mode, and performance mode. In other words, the operating conditions/parameters grouped under its particular mode may be relevant to such mode. For example, fuel trim (i.e., operating condition/parameter) may be relevant to economy (i.e., mode). The default settings may select five most appropriate operating conditions/parameters to be displayed within each mode. Or, the user may customize these five default operating conditions/parameters such that other user desirable operating conditions/parameters may be displayed on the monitor.

A second format comprises a series of layered screens. The top most layer may comprise a set of icons that identify the five different modes identified above. The second layer may display a single operating condition/parameter within each of the five different modes. Upon depressing the operating condition/parameter, a detail screen of the mode may be displayed or a component screen may be displayed. In this regard, the layered screens provide a greater amount of detail and clarity to the user as the user navigates through the layered screens. In this second format, the user may customize the second layer (i.e., the home screen) in that a selected operating condition/parameter within each of the five modes may be displayed on the monitor simultaneously.

In both formats, the gauge is equipped with an alarm. The alarm may notify the user/driver that an operating condition/parameter has exceeded an alarm condition. If multiple operating conditions/parameters have exceeded multiple alarm conditions, then the gauge prioritizes the triggered alarm conditions based on which alarm conditions would trigger a malfunction indicator light which is part of the OBD.

The gauge may also be equipped with the ability to provide suggested remedial actions. In this regard, the suggested remedial actions may be based upon 1) collected data of an operating condition/parameter over time or 2) the combination of alarm conditions that were exceeded by their respective operating conditions/parameters.

The gauge may also be equipped with an external warning light which may engage either a first warning light receptacle or a second warning light receptacle. The first receptacle may be located on a longitudinal edge of the gauge, and the second receptacle may be located on a lateral edge of the serial data gauge. There may be five different external lights. Each light having a different pin configuration and a different LED periphery configuration. Furthermore, each of the external warning lights may have a light emitting diode to indicate when an operating condition of the vehicle has exceeded its respective alarm threshold.

The pins of the external warning light may be located below the light emitting diode and have the following configuration. In particular, a first and second pin may be located on a left hand side of the light so as to power the LED when an operating condition exceeds its respective alarm threshold. A third pin may be located at different positions to the right of power and ground pins such that when the external warning light is engaged to the receptacle, the third pin contacts a respective pads of the receptacle to set the mode/package of the gauge.

Further, the external light may be engaged to either the first or second receptacle, and in this regard, if the external light is engaged to the first receptacle, then the operating conditions displayed on the monitor may be horizontally oriented. And if the external light is engaged to the second receptacle, then the operating conditions displayed on the monitor may be vertically oriented.

The method by which the gauge efficiently communicates with the OBD will now be discussed. In particular, the gauge queries the OBD in batch requests. In other words, the gauge sends a request to the OBD requesting the OBD to provide data at particular PIDs (i.e., parameter identification). The data at the PIDs relate to the operating conditions/parameters of the automobile. However, as stated above, the OBD is a diagnostic tool and is designed for the purpose of helping the automobile produce lower emissions. In this regard, the batch request sent by the gauge may be ignored when received by the OBD if the OBD is processing emissions related issues internally. As such, the data sent to the gauge may be late or untimely or unusable by the gauge. The gauge of the present invention divides the batch into smaller batches. These smaller batches are sent at different time intervals and at different frequencies in order to reduce the possibility that the OBD processor cannot process both its internal emissions related issues as well as the batch request. Hence, the gauge transforms the OBD which is diagnostic tool for lowering automobile emissions to robust multi functional gauge that may be transferred from auto to auto with an easy to navigate format. Simply put, the gauge of the present invention is a robust state of the art gauge.

BRIEF DESCRIPTION OF THE DRAWINGS

These, as well as other features of the invention, will become more apparent upon reference to the drawings wherein:

FIG. 8 is a perspective view of a third bracket mounting the gauge so as to be removeably attachable to a windshield of the automobile;

FIG. 8a is a close up perspective view of the third bracket illustrating that the monitor is removeably attachable to the windshield via a suction cup;

FIG. 9 is a perspective view of a fourth bracket having a flexible extension arm;

FIGS. 20a–e are first through fifth lists of operating conditions associated with first through fifth packages/modes;

DETAILED DESCRIPTION OF THE INVENTION

Figure 1:
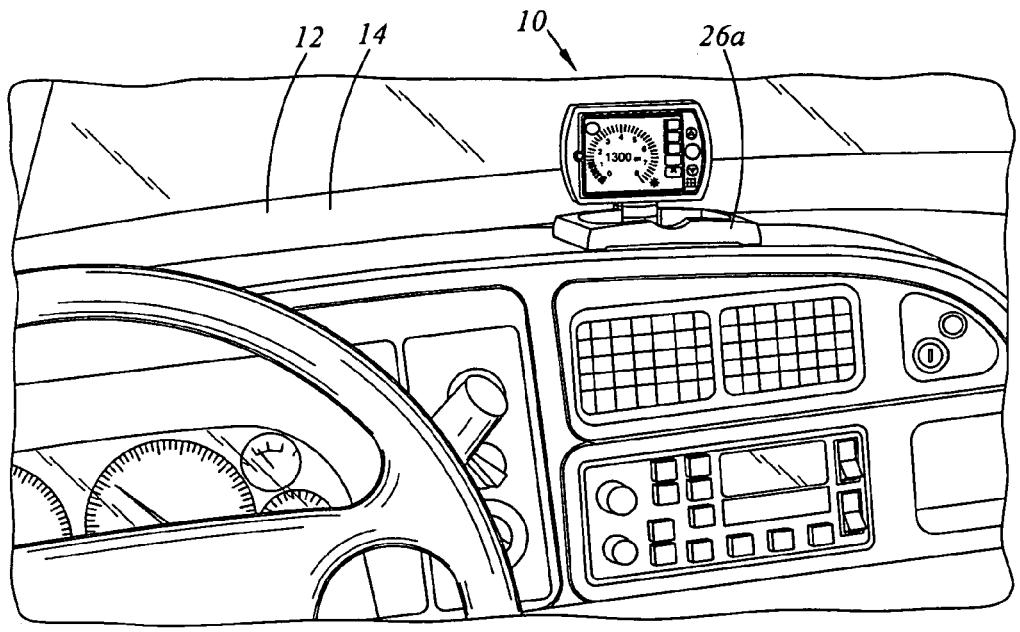
FIG. 1 is a perspective view of a gauge permanently mounted onto a dashboard of an automobile.
Figure 2:
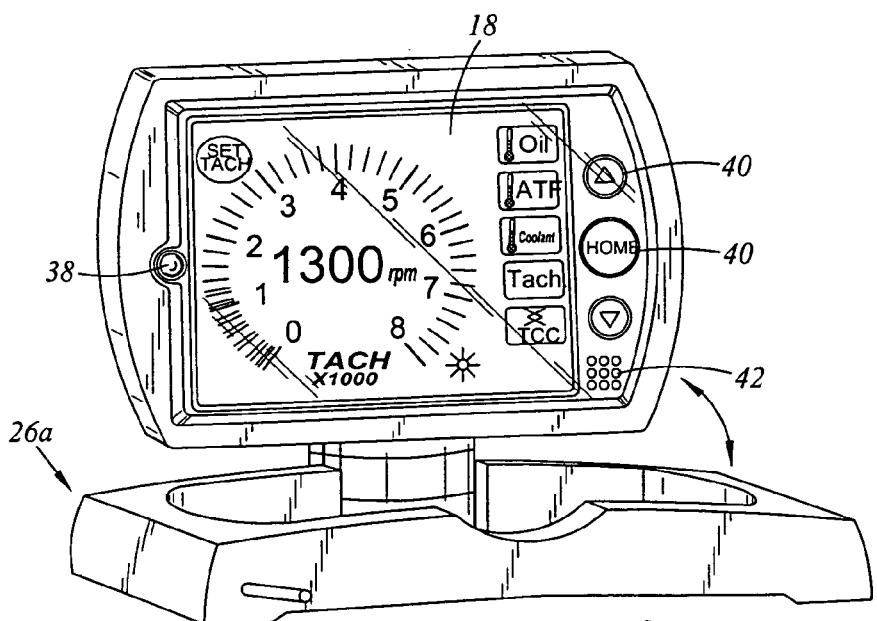
FIG. 2 is a perspective view of the gauge shown in FIG. 1 illustrating a monitor rotatable into a base of the gauge, a detail screen including icons displayed on a touch sensitive monitor, hard buttons and a voice recognition system to navigate to other detail screens and component screens.
Figure 3:
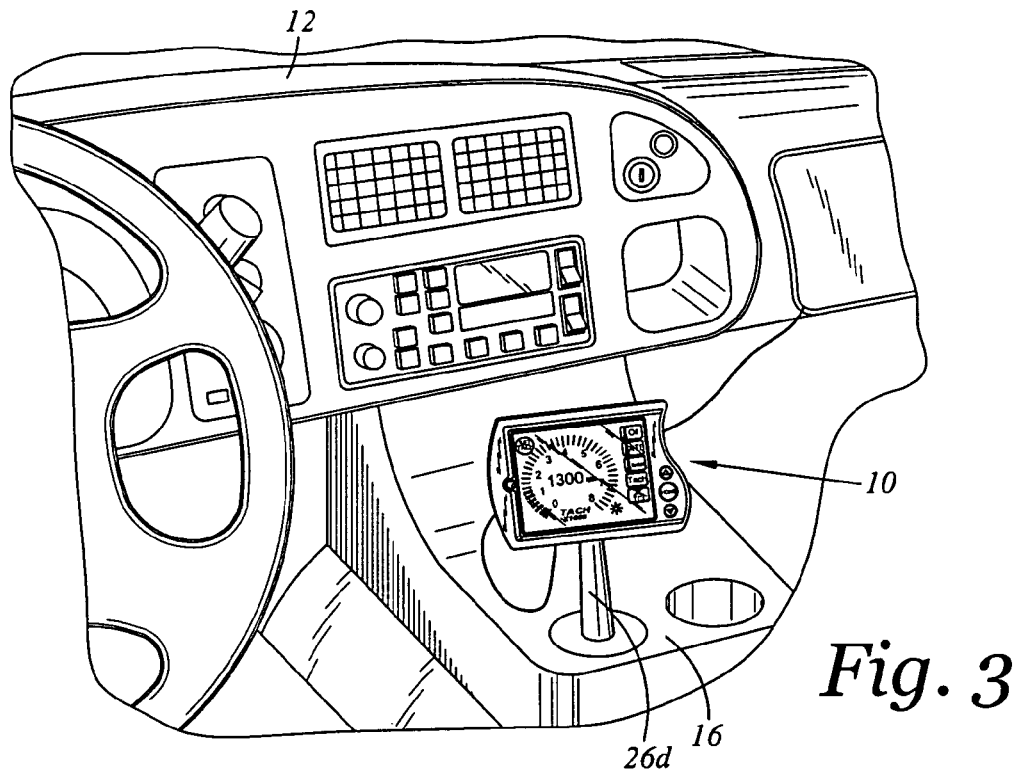
FIG. 3 is a perspective view of a gauge removeably mounted into a cup holder of the automobile.

The drawings shown herein are for the purposes of illustrating the preferred embodiments of the present invention and are not meant to limit in any respect the various aspects of the present invention described in this specification. For example, FIGS. 1–4 illustrate two different methods of mounting a gauge 10 in an automobile 12 such that the gauge 10 is viewable by a driver. In particular, FIG. 1 illustrates the gauge 10 being fixedly attached to a dashboard 14 of the vehicle 12, and in contrast, FIG. 3 illustrates the gauge 10 being removably insertable into a cupholder 16 of the automobile 12. In this regard, the methods of mounting the gauge 10 to the automobile 12 are not limited to the methods disclosed in this specification (i.e., dash mounted or cup holder mounted); rather the methods disclosed to mount the gauge 10 to the automobile 12 are illustrative and not exclusive to the methods by which the gauge 10 may be mounted to the automobile 12. Similarly, FIGS. 5–17 are merely illustrative of the various aspects of the present invention and are not meant to limit in any respect any aspects of the present invention disclosed herein.

Figure 4:
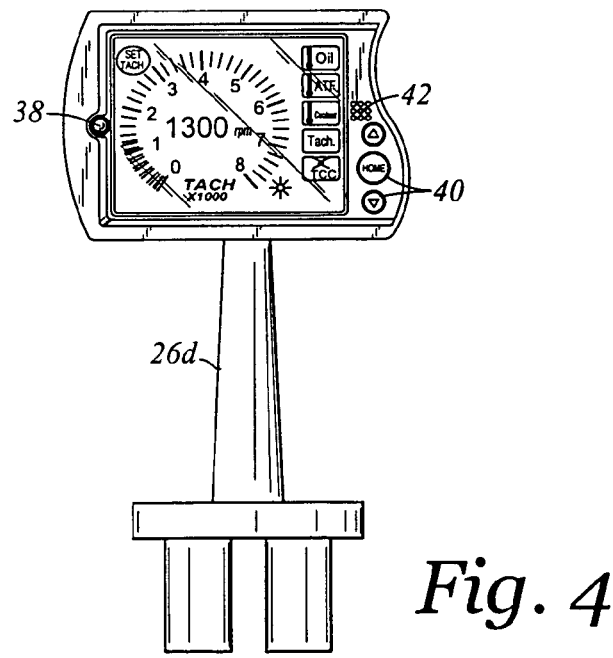
FIG. 4 is a front view of the gauge of FIG. 3 illustrating a cup shaped prong attached to the monitor wherein the cup shaped prong may be receivable into a cup holder of the automobile.
Figure 5:
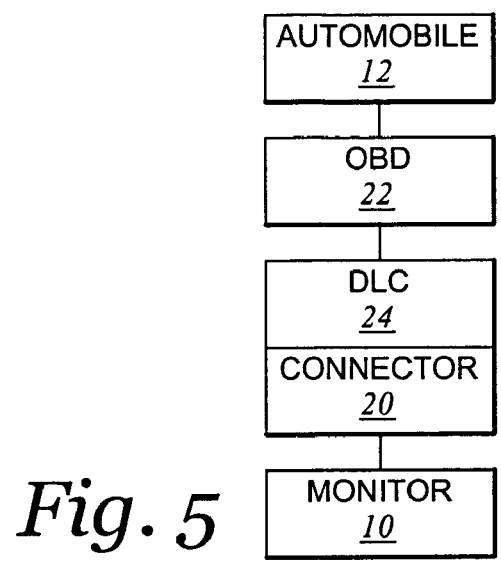
FIG. 5 is a block diagram of the gauge in communication with an on board diagnostic system of an automobile.

In an embodiment of the present invention, the gauge 10 which is an aspect of the present invention may comprise a monitor 18 (see FIGS. 2 and 4) and a connector 20 (see FIG. 5). The monitor 18 and the connector 20 are in electronic communication with each other. For example, the monitor 18 and the connector 20 may be in communication with each other by wire or wireless communication. If the monitor 18 and connector 20 are in communication by wire, the wire may be lined with hooks (i.e., VELCRO) so that the wire may be attached to loops (i.e., VELCRO; mates to hooks) that may be lined to the foot well of the driver for easy installation. If the monitor 18 and the connector 20 are in wireless communication, then technology such as 802.11, RF or zigbee may be used to place the connector 20 and the monitor 18 in wireless communication.

The connector 20 may be connectable to an on board diagnostic computer 22 (OBD; see FIG. 5) and more particularly, a Data Link Connector (DLC) 24 of the OBD 22. The OBD 22 may be a first generation OBD I or a second generation OBD II. For example, the data link connector 24 (see FIG. 5) for OBD-II compliant vehicles is J1962 connector. In this regard, the installation of the gauge 10 to the automobile 12 is extremely easy because OBD II compliant automobiles have a standard mating connector (DLC) 24 under the dashboard by the foot of the driver. Moreover, since only one wire may be used to place the connector 20 and the gauge 10 in electrical communication, the interior of the automobile is not messy or unattractive. Preferably, the connector 20 and the gauge 10 would be in wireless communication with each other. And, in this regard, the installation of the gauge 10 would be cleaner (i.e., no wires) compared to the wired communication between the gauge 10 and the connector 20.

Figure 6:
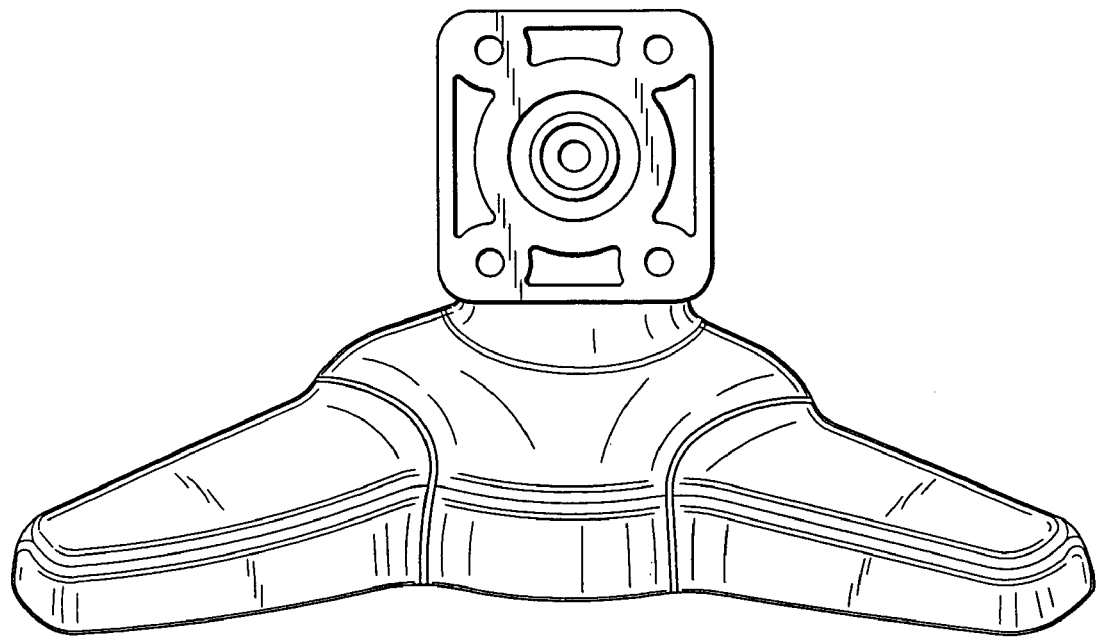
FIG. 6 is a perspective view of a first bracket to permanently mount the gauge to a dashboard of an automobile.
Figure 7A:
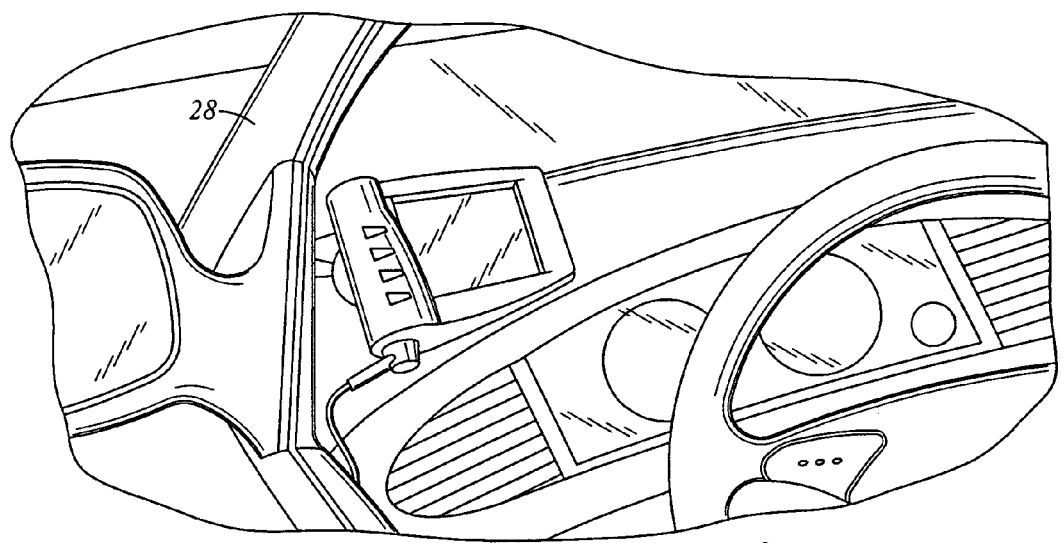
FIG. 7a is a front perspective view of a second bracket permanently mounted to the automobile and position low in relation to the visor.
Figure 7B:
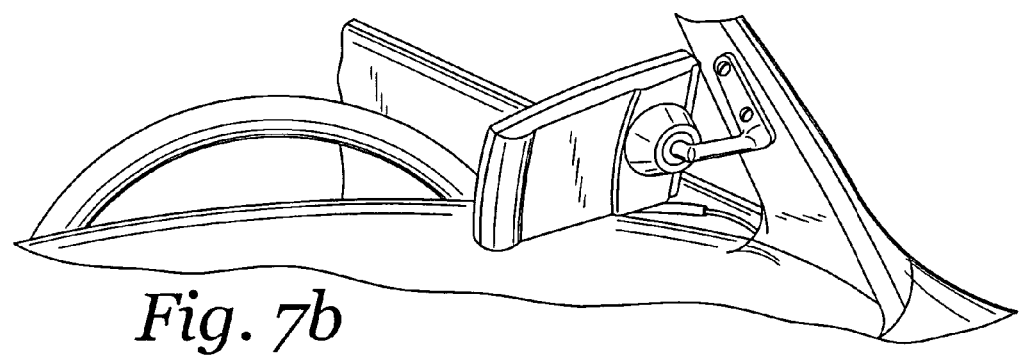
FIG. 7b is a rear perspective view of the second bracket illustrating the second bracket being mounted to an "A" pillar of the automobile.

The gauge 10 may be mounted to the automobile 12 in different positions and by different methods. For example, as shown in FIG. 1, the gauge may be mounted to the dash board of the automobile 12. In this regard, the gauge 10 is mounted to a bracket 26a (see FIGS. 1 and 2) which is subsequently mounted to the dashboard. Moreover, the bracket 26a may be permanently affixed to the dashboard via screws, or preferably, an adhesive tape. Similarly, the gauge 10 may be mounted via a different type of bracket 26b as shown in FIG. 6. The difference between the brackets 26a and b in FIGS. 1 and 6 is that FIG. 1 illustrates a bracket 26a with a square bottom (the gauge may be turned off when the monitor is flipped down into the bracket), whereas the bracket 26b shown in FIG. 12 has a V configuration. Both brackets 26a and b have a bottom surface which are configured to receive the dash board of the automobile and sized so as to provide stability to the gauge 10 when the automobile is being driven. In an alternative to a dash mount, a bracket 26c may be provided which is configured to mount to the "A" pillar 28 of the automobile, as shown in FIGS. 7a and 7b. The bracket 26c may be mounted lower than a visor of the automobile so as to avoid interference between the visor and the gauge 10. FIG. 7b illustrates a rear view of the bracket mounted to the "A" pillar 28.

In contrast to the permanently mounted brackets 26a, b, c discussed above, the gauge 10 may be removeably attached to the automobile 12, as will be discussed below. For example, as shown in FIGS. 3 and 4, the gauge 10 may be attached to a bracket 26d wherein the bracket 26d is receivable into a cup holder 16 of the automobile. When inserted into the cup holder 16, the bracket 26d may stabilize the gauge 10 to the automobile. FIG. 8 illustrates an alternative bracket 26e that is removeably attachable to the automobile. In FIG. 8, the gauge 10 is mounted to a suction cup 30, and the suction cup 30 may be mounted to the windshield 32 of the automobile. FIG. 8 illustrates that the gauge 10 may be mounted low so as to avoid impeding the line of sight of the driver, and FIG. 8a illustrates a close up view of the gauge 10 mounted to the dash board with the suction cup 30. As a modification to the suction cup method of mounting the gauge 10 to the automobile, an extension arm 34 may be interposed between the suction cup 30 and the gauge 10, as shown in FIG. 9. In FIG. 9, the extension arm 34 is shown to be configurable in the sense that the driver may bend the extension arm 34 such that the gauge 10 is at a desired position, and the extension arm 34 will remain stationary.

Accordingly, the difference between the permanent mounting methods and the removeably attachable mounting methods is that the removeably attachable gauge 10 may be removed from a first car then attached to a second car, whereas removal of the gauge 10 permanently mounted to the dashboard is impossible to detach without physically defacing the dashboard. This is simply stated but the benefits of the removeably attachable mounting method are enormous in view of the ease by which the gauge may be made operative as a gauge (i.e., connecting gauge connector 20 to DLC 24). In essence, these two features (i.e., quick install and removeably attached) combined in a single gauge 10 enable the driver to transfer one gauge 10 between two automobiles without undue difficulties. For example, a driver may own a light duty truck (i.e., first car) as well as a sports car (i.e., second car). In this instance, the driver may desire to attach the gauge to the truck when driving the truck, and thereafter attach the gauge to the sports car when driving the sports car. In this regard, the detachment of the gauge 10 from the truck and reattachment to the sports car is extremely quick and convenient based on a view that installation of the gauge of the present invention merely requires connection between the connector 20 of the gauge 10 and the mating connector or data link connector 24 of the OBD 22. In the prior art, a single gauge could not be used on two vehicles based on a view that to make the gauge operative, the gauge had to be hard wired to the components of the vehicle. As such, de-installing the gauge from the first car and installing the gauge to the second car would be prohibitively time consuming.

In another aspect of the invention, the gauge 10 is a multi function gauge. Simply put, the gauge 10 has the capability of displaying many different operating conditions/parameters (e.g., engine speed, coolant temperature, and the like) of the automobile 12 simultaneously. In this regard, this feature in combination with the ease by which the gauge 10 is removable from a first automobile and attachable to a second automobile enhances the gauge 10 of the present invention because this removal and attachment takes a minimal amount of time and promotes the use of the gauge on other automobiles such as in a rental car situation or a single driver with multiple automobiles situation.

A discussion of the various operating conditions/parameters and its related aspects (e.g., alarm conditions) will first be discussed, and then a discussion of the user interface will be discussed. The various operating conditions/parameters displayable by the gauge 10 may be categorized under different modes such as gauge mode, diagnostic mode, economy mode, towing mode, and performance mode 36a–e, respectively, as shown in FIGS. 10–14, and more particular, as shown in FIG. 11. Moreover, a single operating condition/parameter may be categorized under one, two or more modes 36. For example, tachometer reading is an operating condition/parameter, and this operating condition/parameter may be categorized under all the modes 36a–e, whereas altimeter reading may be an operating condition/parameter categorized only under the towing mode.

Within each mode 36a–e discussed above, there may be a plurality of operating conditions/parameters. These operating conditions/parameters may comprise a calculated result such as engine load or a temperature reading such as coolant temperature. Under the towing mode 36d, the following operating conditions/parameters may be grouped: engine load, torque converter lock up status, engine vacuum, transmission temperature, exhaust gas temperature, exhaust brake pressure, boost pressure, altimeter, gear position selected vs. attained, calculated load, line pressure, transmission slippage, barometer, compass/ambient temperature, coolant temperature, and revolutions per minute of the engine.

Under the performance mode 36e, the following operating conditions/parameters may be grouped: horsepower, torque, ⅛ and/or ¼ mile times and top speed, 0-60 times, acceleration and cornering G force, and braking distance. Under the gauge mode 36a, the following operating conditions/parameters may be grouped: tachometer reading, coolant temperature, oil temperature, transmission temperature, exhaust gas temperature (diesel only), intake air temperature, TPS, Fuel Pressure, Oil Pressure, Fuel Trim, Barometric Pressure, and system voltage. In the alternative, all the operating conditions/parameters grouped under the other modes 36b–e may additionally be grouped under the gauge mode 36a. Under the diagnostic mode 36b, the following operating conditions/parameters may be grouped: code number, OBD II codes, pending codes, check engine light status, charging system/battery voltage, monitor and I/M status, O2 sensor data, and fuel system status. Under the economy mode 36c, the following operating conditions/parameters may be grouped: fuel—miles per gallon (MPG)/distance till empty, fuel level %, engine vacuum/calculated load, trip mileage, fuel trim, and ignition timing.

Figure 12A:
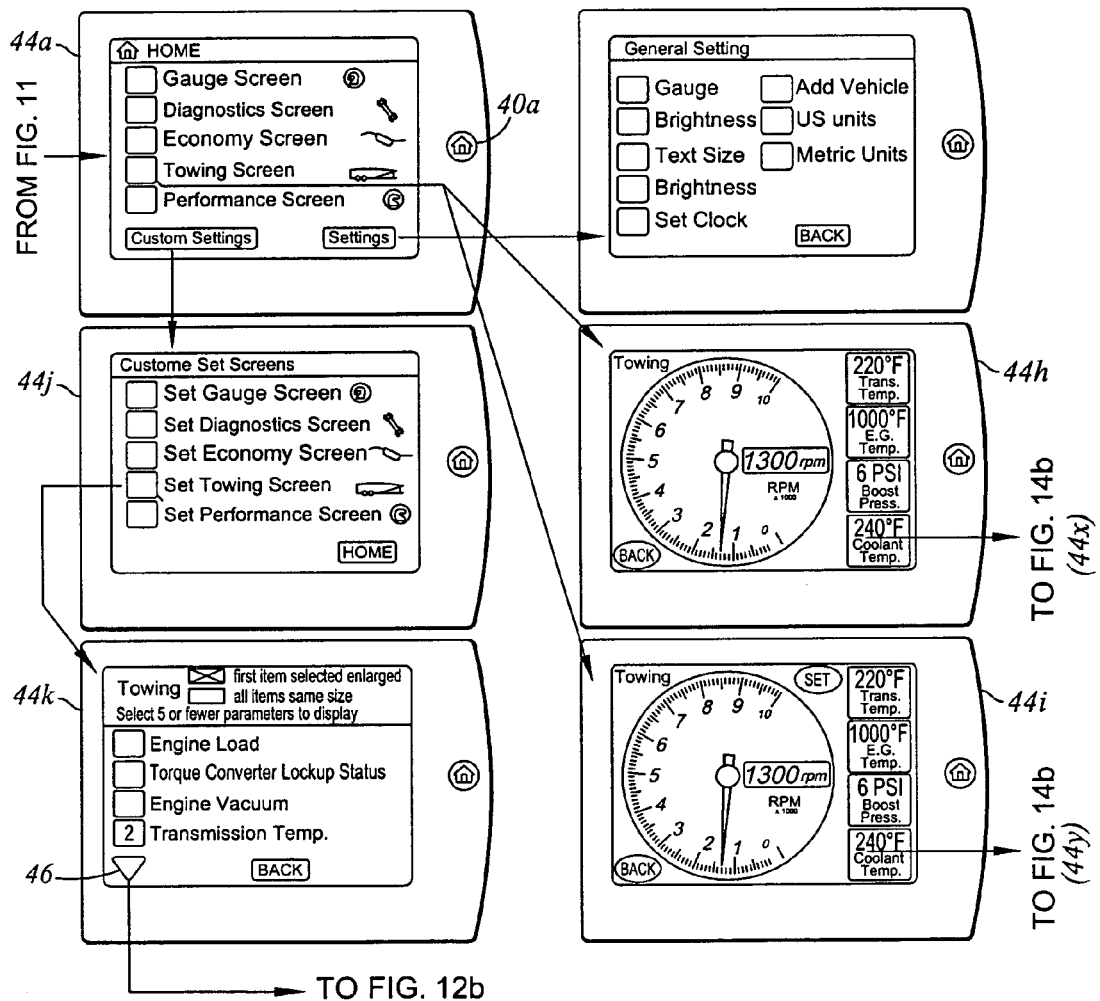
FIG. 12 is an illustration of screens for customizing the format of the operating conditions/parameters displayable on the monitor.
Figure 12B:
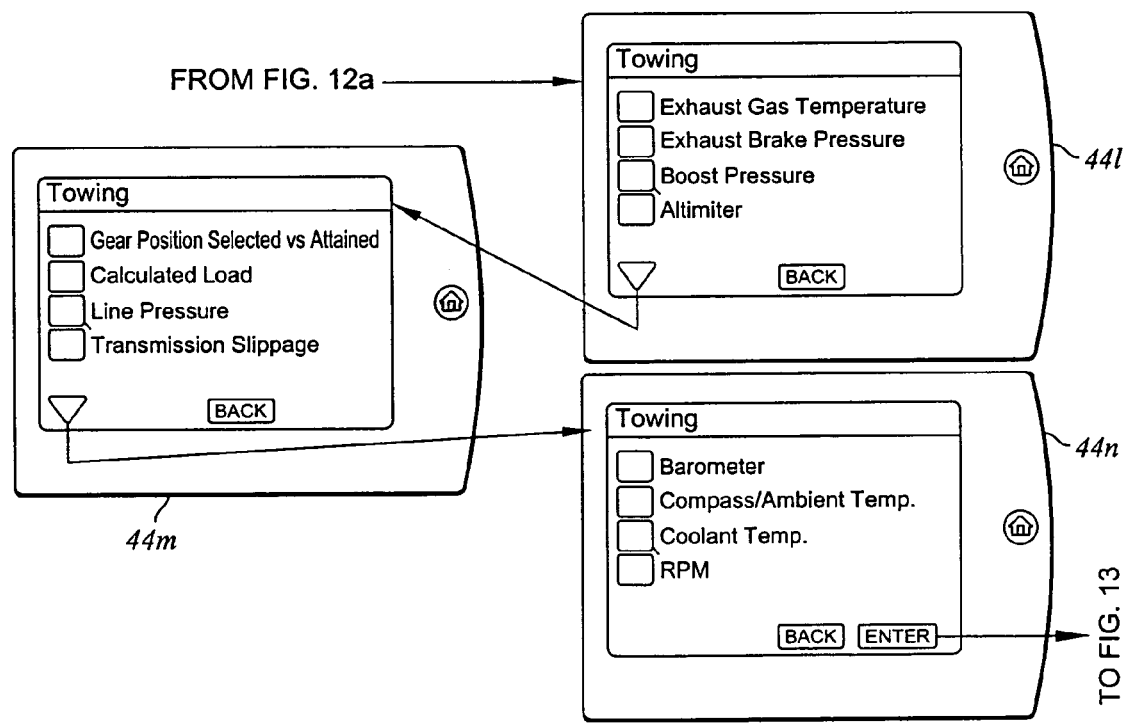

These operating conditions/parameters may be associated with alarm conditions. The alarm conditions may be maximum and/or minimum values which when exceeded by the operating conditions/parameters trigger an alarm 38 (see FIGS. 2, 4 and 12). FIGS. 2 and 4 illustrate the alarm as a red light emitting diode (LED), and FIG. 12 illustrates the alarm as an illuminated icon. In the alternative, the alarm may be an externally mounted light. Furthermore, the alarm may also be an audible noise/signal such as a beeping sound. The alarm 38 may be operative to notify the driver 1) that the operating condition/parameter has exceeded the alarm condition and 2) of the maximum value of the operating condition/parameter after the alarm has been triggered. For example, the tachometer reading (i.e., operating condition/parameter) may be associated with a red line value such as 7000 rpm (i.e., maximum alarm condition). Accordingly, when the operating condition/parameter (i.e., engine speed) of the automobile exceeds 7000 rpms then the alarm 38 may be triggered. Moreover, the gauge 10, as will be discussed further below, may display the maximum value of the operating condition/parameter after the alarm 38 was triggered. As such, if the engine speed reached 7500 rpms then the alarm 38 may be operative to notify the driver of such maximum rpm value. The alarm 38 may be a visual signal such as a red colored display (see FIGS. 2 and 4) or an illuminated operating condition/parameter icon (see FIG. 12).

The user may interface with the gauge 10 through the monitor 18. In this regard, the monitor 18 may be a touch sensitive screen wherein touching mode icons 37 on the monitor 18 may be operative to navigate through the layered screens. In the alternative, the user may interface with the gauge 10 through a set of hard buttons 40 (see FIGS. 2 and 4) located next to the monitor 18 and formed within a covering of the monitor 18. Accordingly, depressing the hard buttons 40 may be operative to navigate through the layered screens. It is still further contemplated that the hard buttons 40 may be located and attached to the steering wheel (not shown) of the automobile. In still another alternative, the user may navigate through the layered screens through a voice recognition system 42 (see FIGS. 2 and 4). Despite the mode of navigating through the layered screens, commands that are intuitively similar may be utilized between each of the modes. For example, to get to the home screen 44a (see FIG. 12), the user may depress a icon of a home on the monitor, depress a hard button 40a with a home printed on the hard button 40, and/or speak "home" into the voice recognition system 42.

Figure 10:
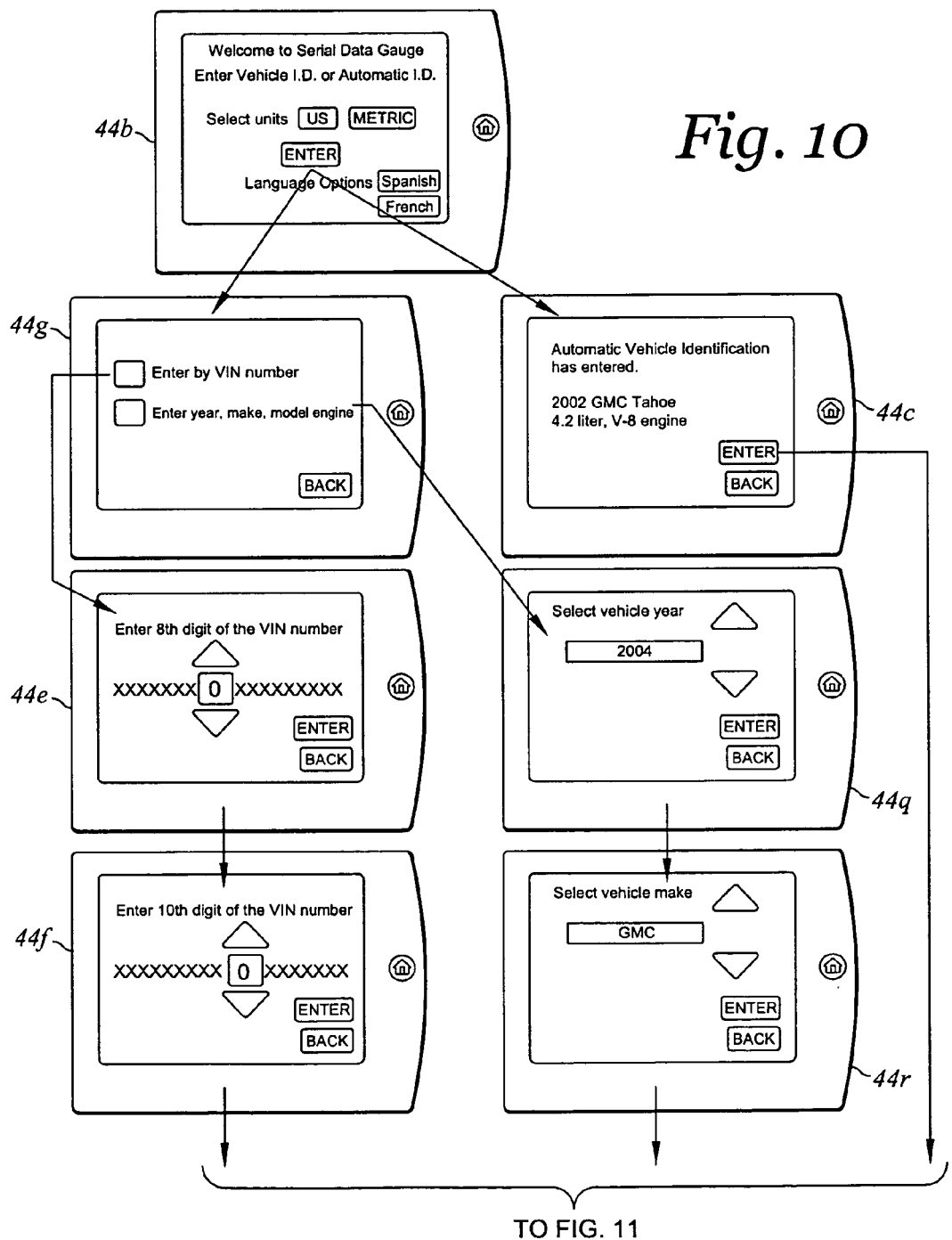
FIG. 10 is an illustration of various screens to identify the automobile.
Figure 11:
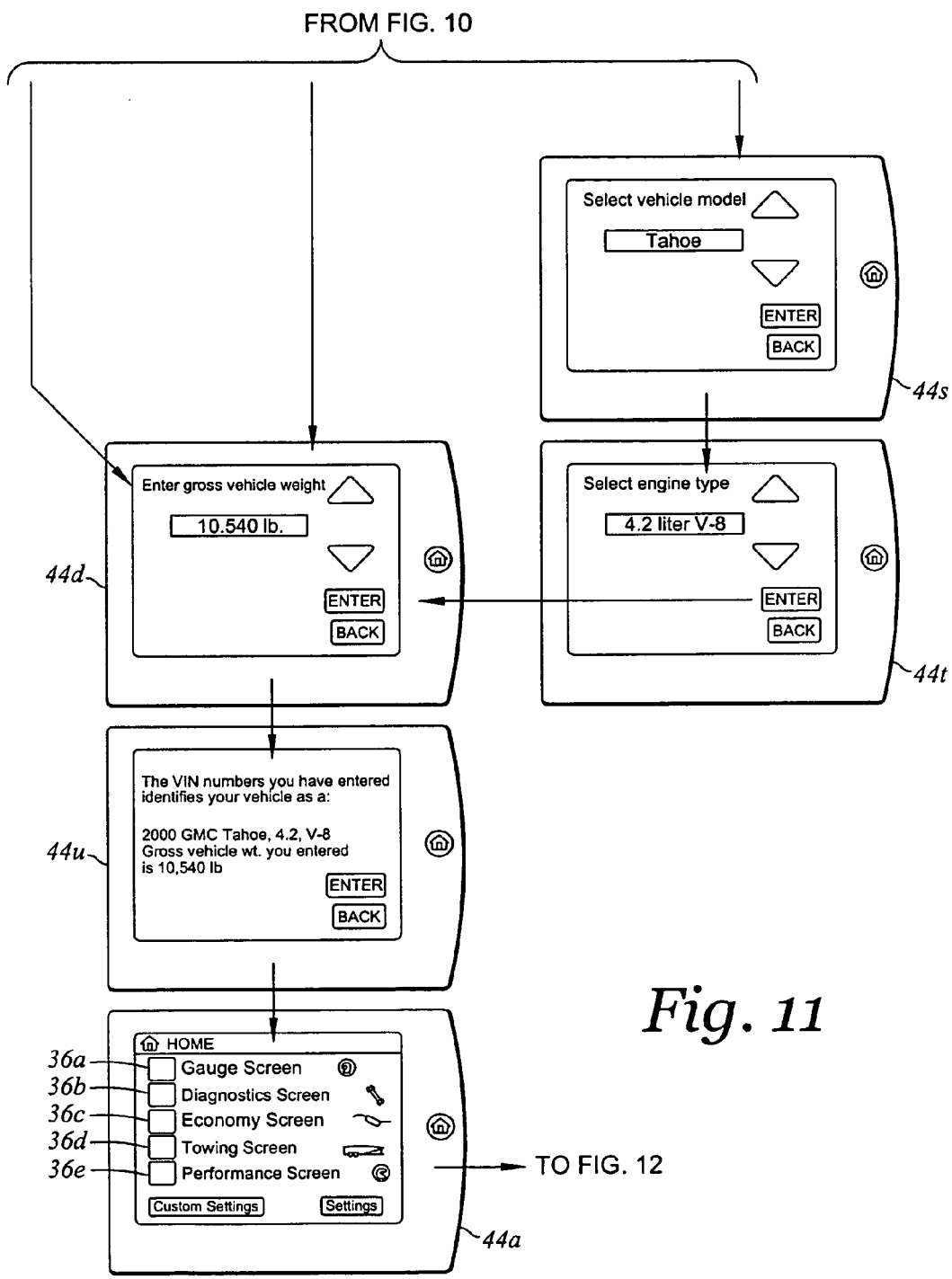
FIG. 11 is an illustration of additional screens to identify the automobile.

The layered screens 44 are depicted in FIGS. 10–16. The gauge 10 when initially installed on an automobile may proceed through initiating screens 44 shown in FIGS. 10–11. As shown in FIG. 10, the first initiating screen 44b defaults to English, and alternatively, the gauge 10 may be customized to display information in Spanish or French. The first screen 44*b* requests the user to select whether the units of measurement will be in metric units or English units. Thereafter, the user may depress "ENTER" which is operative to automatically identify the year, make, model and engine (y/m/m/e) of the automobile to which the gauge 10 has been installed. The gauge may display a possible y/m/m/e based on data retrieved from the OBD, as shown in 44*c*. The user is requested to confirm that the appropriate vehicle has been identified by depressing "ENTER," or to manually enter the proper y/m/m/e by depressing the "BACK" icon. If the user depresses "ENTER," then the user is requested to enter the gross vehicle weight of the vehicle (see FIG. 17; screen 44*d*). If the user depresses "back," then user is provided the option (see FIG. 10, 44*g*) of identifying the vehicle by VIN number (i.e., identifying the 8 and $10^{th}$ digit of the VIN number, see FIG. 10 44*e* and *f*) or by inputting the appropriate y/m/m/e of the vehicle (FIG. 10, 44*q*, *r*; and FIG. 11, ffs, t). After properly identifying the vehicle, the user may be requested to enter the gross vehicle weight of the vehicle (see FIG. 11, 44*d*). Thereafter, the user is requested to confirm the data of the vehicle (see FIG. 11, 44*u*). Once the data has been confirmed, then the gauge displays the home screen 44*a* (see FIGS. 11 and 12).

The home screen 44*a* may display five different modes 36*a–e*, namely, the gauge mode, diagnostics mode, economy mode, towing mode, and performance mode, and two icons identified by "CUSTOM SETTINGS" and "SETTINGS" (see FIG. 11). Depressing any one of the modes 36 displayed on the home screen 44*a* may be operative to display five different operating conditions/parameters related to the mode 36. For example, depressing the towing mode icon from the home screen 44*a* (see FIG. 12) is operative to display the towing detail screen 44*h* or i shown in FIG. 12 depending on whether the vehicle is stopped (i.e., placed in park) or moving (i.e., placed in drive), respectively. The detail screen 44*h* or i displays five operating conditions/parameters. The first is the primary operating condition/parameter within the mode 36. By way of example and not limitation, the primary operating condition/parameter is shown as the engine speed in FIG. 12. This primary operating condition/parameter may be enlarged and displayed in an analog format as well as textual format. The second, third, fourth and fifth operating conditions/parameters may be displayed adjacently to the primary operating condition/parameter (i.e., sequentially in a vertical manner) with smaller icons compared to the icon for the primary operating condition/parameter. The second, third, fourth, and fifth operating conditions/parameter may be textually depicted. The five operating conditions/parameters may be default operating conditions/parameters selected by the manufacturer to be the most desirable operating conditions/parameters to be displayed under the selected mode 36.

Figure 13:
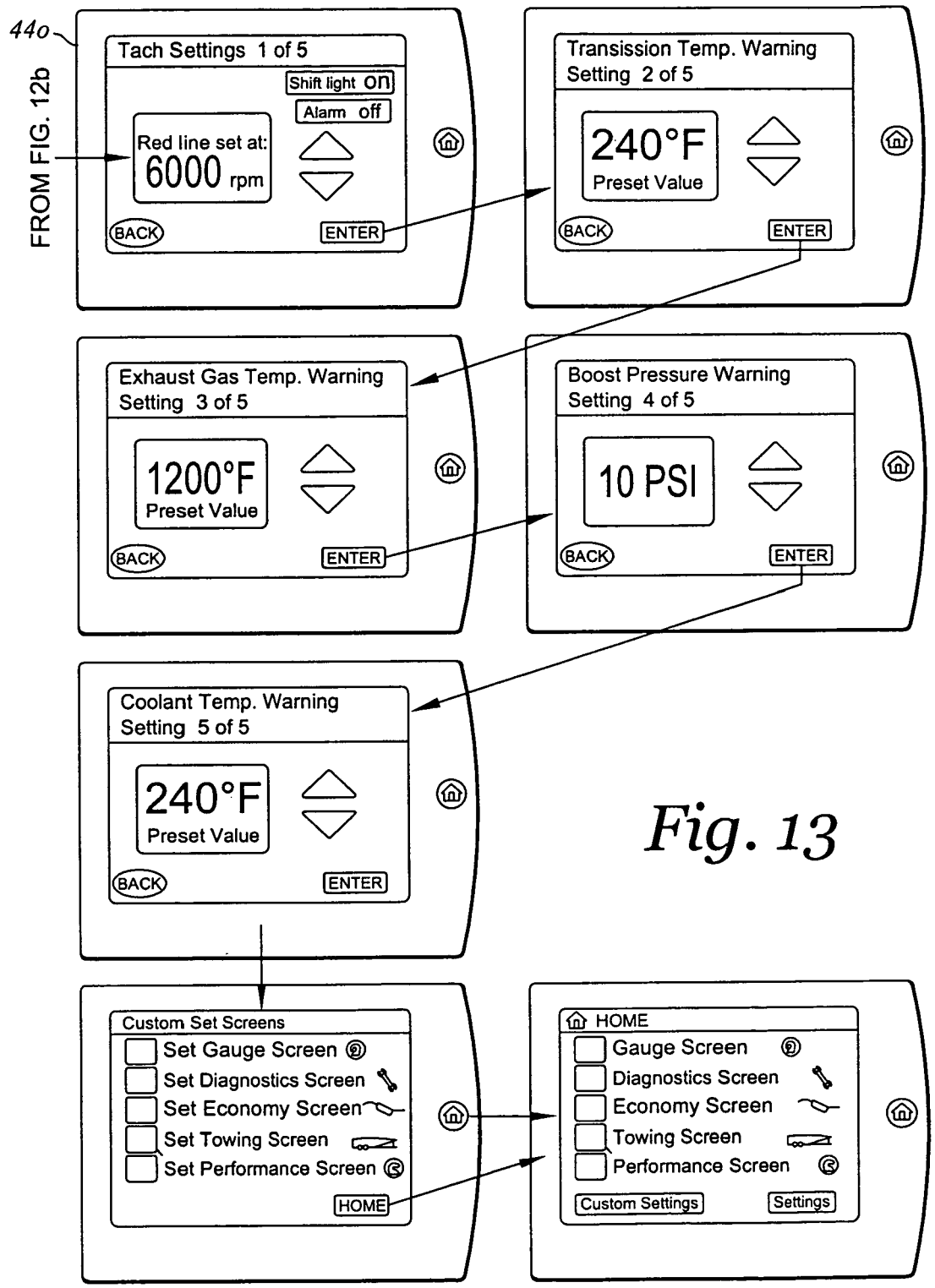
FIG. 13 is an illustration of screens for setting alarm conditions.

The default operating conditions/parameters displayed on the detail screen 44 of each respective mode 36 may be customized. In this regard, the user may depress the "CUSTOM SETTINGS" icon at the home screen 44*a* (see FIG. 12). The gauge may now display the "CUSTOM SET SCREENS" 44*j* with five different icons representing the five modes above, as shown in FIG. 12. The user may depress one of these icons and customize which operating conditions/parameters may be displayed on the monitor 18 at the detail screen 44 level. For example, the user may depress the "SET TOWING SCREEN" icon at the Custom Set Screens 44*j*. Thereafter, the user may be provided with an option (see FIG. 12, 44*k*) to display all five operating conditions/parameters the same size, or to display the primary operating condition/parameter in an enlarged format. Furthermore, the user may be presented with a plurality of operating conditions/parameters. If all of the operating conditions/parameters are not displayable on the monitor 18 simultaneously, then the user may depress the down arrow 46 to display more operating conditions/parameters, as shown in screens 44*l*, m, and n. When presented with the plurality of operating conditions/parameters associated with the respective modes, the user may depress five different operating conditions/parameters which the user would desire to have displayed on the detail screen 44. The first depressed operating condition/parameter may be set as the primary operating condition/parameter. As indicated in 44*n*, the primary operating condition/parameter is engine speed, as shown in screen 44*n* and labeled "1.". And, the second, third, forth and fifth depressed operating conditions/parameters may be set as the second, third, fourth, and fifth operating conditions/parameters at the detail screen 44 level. After the user has selected all five of the operating conditions/parameters, then the user may be directed to set the alarm condition (see FIG. 13) of the previously selected operating conditions/parameters. For example, as shown in FIG. 13, if tachometer reading, transmission temperature, exhaust gas temperature, boost pressure, coolant temperature were selected as the first-fifth operating conditions/parameters under the towing mode 36, then respective alarm conditions may be set for each of the operating conditions/parameters. Default values may be set at the factory and they may be indicated with the text "Preset Value" displayed on the monitor 18. The alarm condition screen 44*o* for the tachometer reading may further provide the user with the option to toggle the shift light on and the alarm off, or toggle the shift light off and the alarm on.

Thereafter, the user may be redirected to the "CUSTOM SET SCREENS" (see FIG. 13, 44*j*). At the "CUSTOM SET SCREENS," the user may customize each of the modes 36 with different selected operating conditions/parameters and respective alarm conditions. This customizable feature of the gauge 10 provides the driver with the ability to use the gauge 10 for multiple purposes. For example, the user may quickly and easily install the gauge 10 onto his/her sports car and display the performance mode and its corresponding operating conditions/parameters. Thereafter, the user may quickly and easily detach the gauge 10 from the sports car and attach the gauge 10 to his/her sports utility vehicle to tow a boat with the towing mode 36 and its corresponding operating conditions/parameters displayed.

When the vehicle is stopped, the gauge 10 may be customized as discussed above. Additionally, when the vehicle is stopped, the alarm conditions may further be customized through the detail screen 44i (see FIGS. 12 and 14, and more particularly FIG. 14). In particular, when the vehicle is stopped, the detail screen 44*i* (see FIG. 14) has an additional icon "SET." Depressing the "SET" icon may be operative to customize the alarm condition of the respective primary operating condition/parameter. For example, depressing the "SET" icon for the towing detail screen 44*i* customized above may direct the user to the tach settings 44*p* shown in FIG. 14. The user may set the alarm condition for the tachometer operating condition/parameter by depressing the "Set Red Line" icon to be directed to screen 44*v*. Furthermore, at the tach settings screen 44*p*, the user may recall the highest rpm value since last being reset by depressing the "recall highest RPM" icon. Depressing the "recall highest RPM" icon may direct the user to the Tach Settings screen 44*q* which may display the highest RPM of the engine since last being reset. At this screen 44q, the user is also provided with the option of clearing the last highest RPM by depressing the appropriately labeled icon.

Figure 14A:
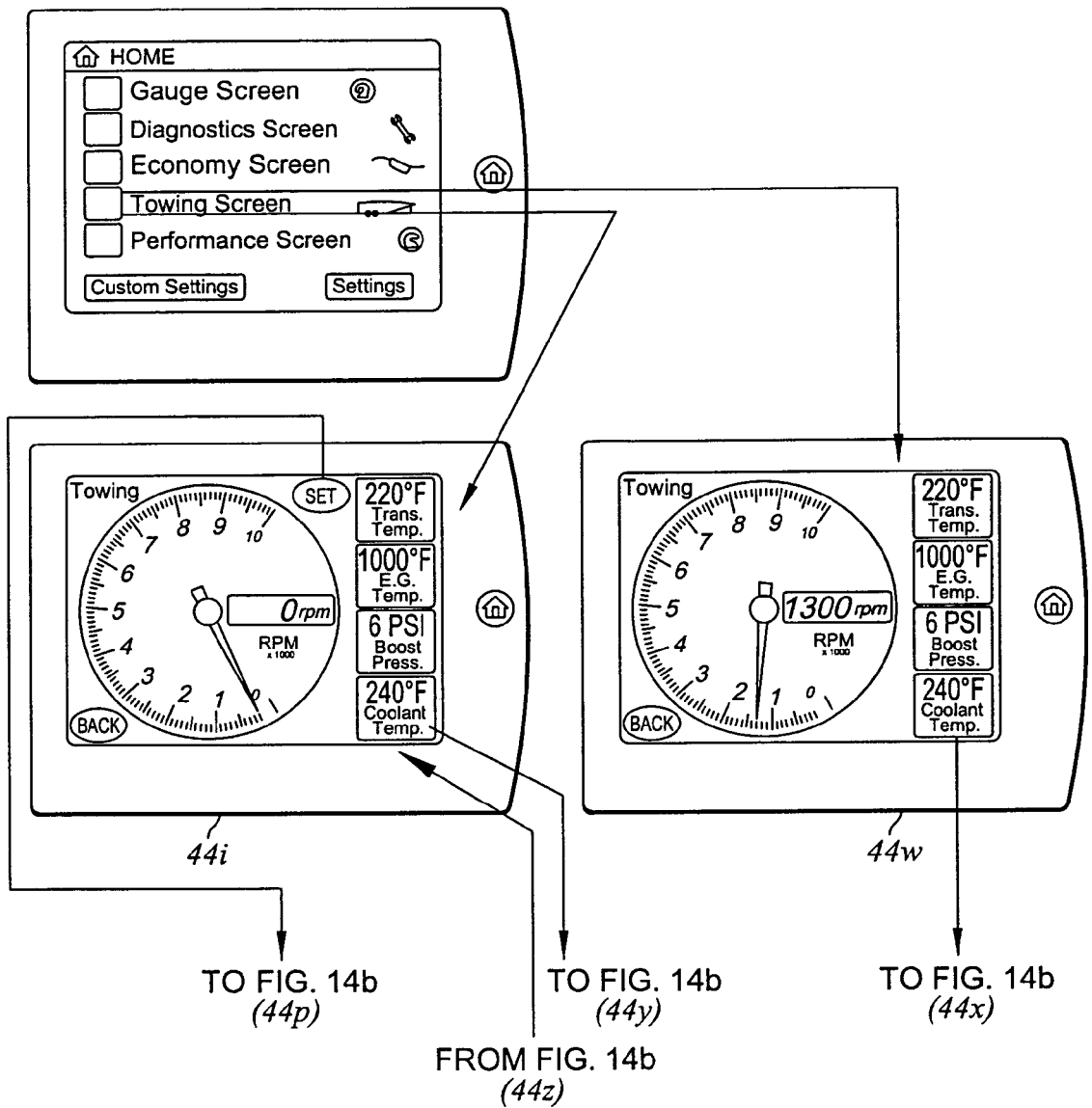
FIG. 14 is an illustration of screens displayed on the monitor when the automobile is parked.
Figure 14B:
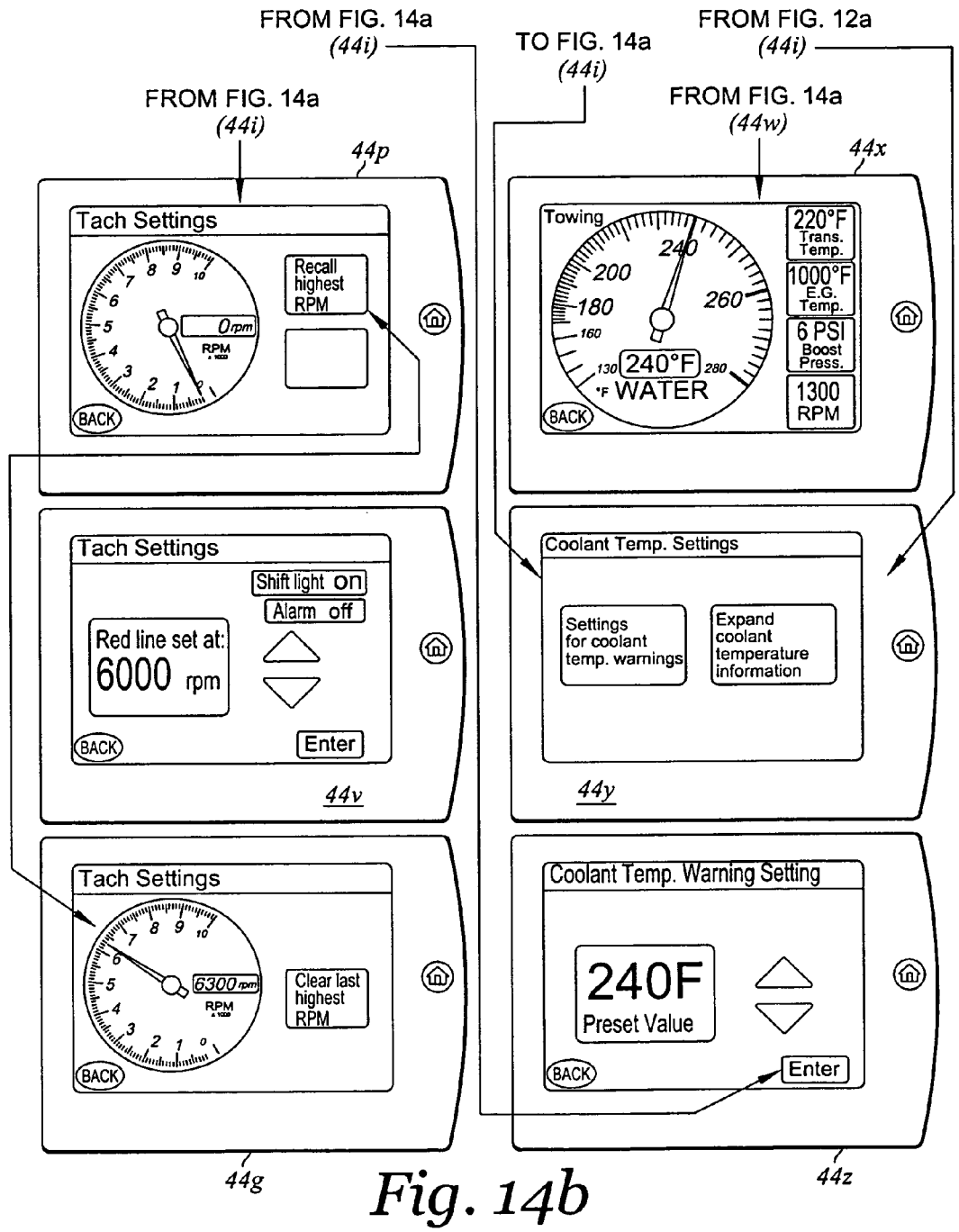

Moreover, if the vehicle is stopped (i.e., in "Drive"), then the user may depress the coolant temperature icon (see FIG. 14, screen 44i) to be allowed to change the alarm condition for the coolant temperature (see FIG. 14, 44y, z). In contrast, if the automobile is in "Drive," then the user may depress the coolant temperature icon (see FIG. 14, screen 44w) to change the primary operating condition/parameter to the coolant temperature (see FIG. 14, screen 44x).

Figure 15:
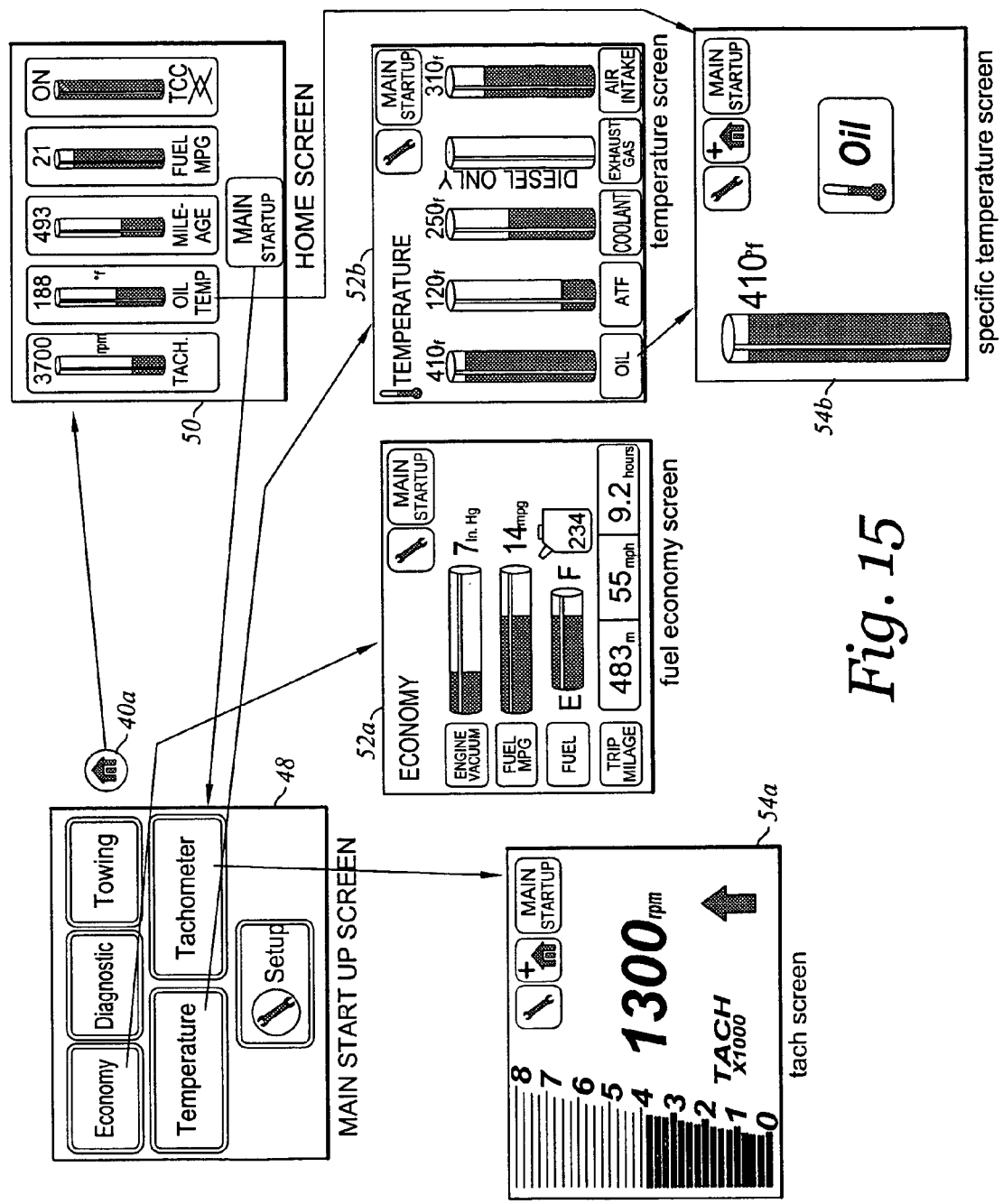
FIG. 15 is an illustration of various screens displayable on the monitor of the gauge, namely, start up screen, home screen, detail screen, and component screen.
Figure 16:
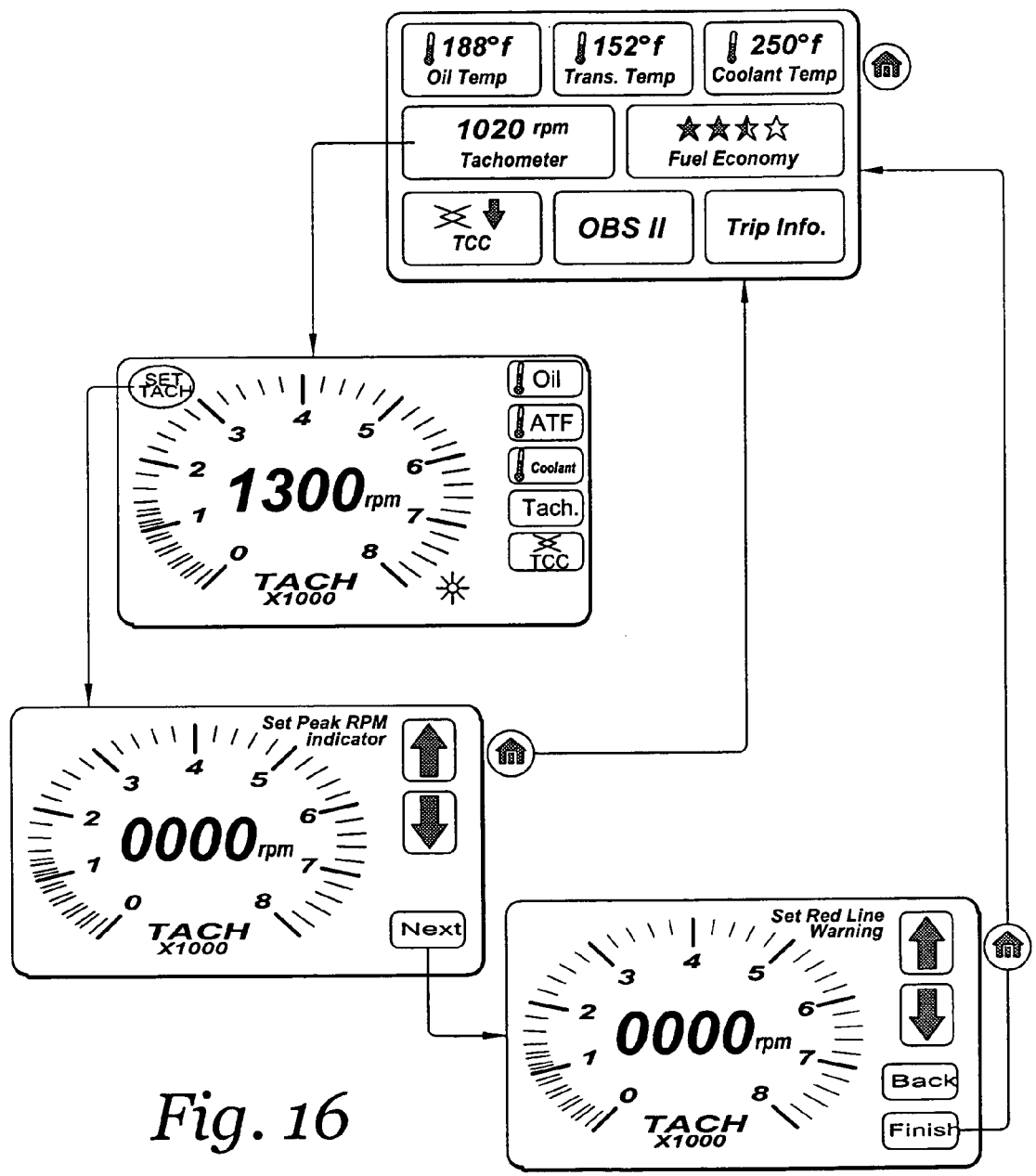
FIG. 16 is an illustration of various set screens of the gauge for setting an operating range of the engine speed.
Figure 17:
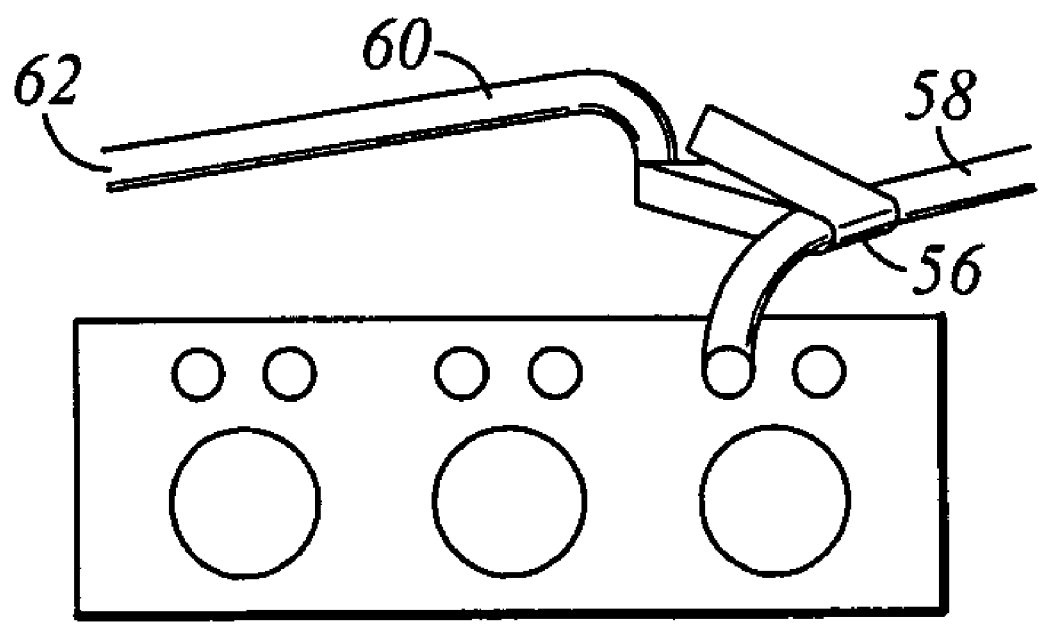
FIG. 17 shows a schematic drawing of the connection between an inductive pickup and a spark plug wire.

In yet another embodiment of the present invention, the user interface of the gauge 10 may be generally described as a series of layered screens, as shown in FIGS. 15 and 16. The layered screens comprise a main start up screen 48, a home screen 50, detail screen 52, and a component screen 54, as shown in FIG. 15. At the start up screen 48, the modes 36 are displayed but the operating conditions/parameter are not displayed. The driver at this point may be provided with two options, each of which will be explored below. First, the user may depress a mode icon on the main start up screen 48. Upon depressing the mode icon, the mode detail screen 52 may be displayed on the monitor. For example, depressing the temperature icon at the start up screen 48 directs the driver to temperature detail screen 52b. The mode detail screen 52 provides five operating conditions/parameters that are selectably viewable on the mode detail screen as discussed above. The five operating conditions/parameters are represented by corresponding icons. Upon depression of the operating condition/parameter icon, the component screen 54 may be displayed on the monitor. For example, depressing the OIL icon at the temperature detail screen 52b directs the driver to component screen 54b.

Second, the user may depress the home hard button 40a to display the home screen 50. The home screen 50 also displays five different operating conditions/parameters. However, the home screen may be different compared to the detail screen 52 because the home screen 50 may display one operating condition/parameter within each of the five modes 36 represented in the main start up screen 48, whereas the detail screen 52 displays five operating conditions/parameter within each mode 36. The five different operating conditions/parameters displayed on the home screen 50 are represented by corresponding icons. Upon depression of the icon, the component screen 54 may be displayed on the monitor 18. But, more preferably, the mode detail screen 52 may be displayed on the monitor 18, and thereafter, the user may depress the operating condition/parameter icon on the mode detail screen 52 to obtain the component screen 54.

Applicable to both formats shown in FIGS. 10–14 and FIGS. 15–16, the alarm conditions, as stated above, are operative to notify the user that the operating condition/parameter has exceeded the alarm condition. For example, at the detail screen 52 (see FIG. 12), the displayed operating condition/parameter whose operating condition/parameter has exceeded the alarm condition may be colored red. For example, in FIG. 12, if the coolant temperature alarm condition were set to 230 degrees Fahrenheit but as shown, the operating temperature reach 240 degrees Fahrenheit, then the coolant temperature icon may be colored red.

At times, more than one alarm condition may have been exceeded by its respective operating conditions/parameters. In this regard, if the operating conditions/parameters that have exceeded its respective alarm condition are contained in different modes 36, then their respective mode screens 44h may be displayed on the monitor 18. The display of the mode screen 44h on the monitor 18 may be automatic. For example, if the towing mode screen 44h has been set to be displayed on the monitor but the alarm conditions related to operating conditions/parameters within the performance mode (not shown) and diagnostic mode (not shown) have exceeded its respective alarm conditions, then the performance mode screen may be displayed. After a selectable pre-set time interval (e.g., 2 seconds), the diagnostic mode screen may be displayed. Furthermore, the gauge may be operative to prioritize the alarms so that the higher priority alarm may be displayed first. The priority of the triggered alarms is based on the operating condition/parameter that has turned on a malfunction indicator light which is part of the OBD.

The gauge 10 may further be operative to provide suggested remedial actions based on the triggered alarm conditions. For example, the alarm condition for the coolant temperature may have been triggered. In this regard, the gauge may notify the driver to stop the vehicle and fill the radiator of the automobile with water. Furthermore, the gauge 10 may collect the operating conditions of the coolant temperature over time. And, based on the time v. coolant temperature graph, the gauge 10 may be operative to determine that the coolant temperature has exceeded the alarm condition because the air conditioning is on. In this regard, the gauge instead of instructing the driver to fill the radiator may notify the driver to merely turn the air conditioning off. Even further still, the gauge 10 may be operative to correlate combinations of triggered alarm conditions and provide suggested remedial action(s) based on the combination of triggered alarm conditions. Simply put, the gauge 10 may be operative to provide suggested remedial action based on a single operating condition/parameter or based on a combination of triggered alarm conditions.

Moreover, in particular, if an operating condition/parameter grouped under the gauge mode 36 has exceeded its respective alarm condition, then the gauge mode screen when displayed on the monitor 18 may be operative to display possible solutions. And, if an operating condition/parameter grouped under the diagnostic mode has exceeded its respective alarm condition, then the diagnostic mode screen when displayed on the monitor may be operative to display information related to affected systems, affected circuit area, probable cause and the like.

The customizable features of the gauge may be provided to the user only when the vehicle is placed in park or stopped. If the vehicle is placed in drive, then the vehicle may be operative to only be toggled between the home screen and the detail screen of a corresponding mode. This disabling characteristic for the gauge is for safety reasons.

As stated in the background of the invention section of this specification, the OBD 22 is primarily used to lower automobile emissions. This may present processing problems at the OBD level. The reason is that the operating conditions/parameter may be retrieved from the OBD 22 while the car is being driven; however, since the OBD 22 is primarily designed to lower automobile emissions, the OBD 22 provides priority to emissions related issues prior to providing the operating condition data to the gauge 10 for display. Accordingly, the gauge 10 may require information at a greater number of intervals than which the OBD 22 may support. For example, the tachometer reading may have to be queried by the gauge 10 and data sent back from the OBD 22 every second. However, if the OBD 22 needs to process emissions related issues, then the OBD 22 will process those issues first prior to sending back data required by the gauge 10. As a result, the operating conditions/parameters displayed by the gauge 10 may be lagged to an extent that is noticeable by a driver. Simply put, the gauge 10 comprises a computer which communicates with the OBD 22, and the requests of the gauge 10 to the OBD 22 require processing by the OBD 22 wherein the OBD 22 may be busy processing higher priority issues. As such, the processing of the requests of the gauge 10 may be in conflict with the processing of the emissions related issues of the automobile. In this regard, an aspect of the present invention includes the method by which the gauge 10 communicates with the OBD 22 so as to transform the OBD 22 (mainly a diagnostic system) into a gauge 10 which may be used while driving the automobile.

The method by which the OBD 22 and the gauge 10 communicates will be discussed. In particular, the gauge 10 may display at most five operating conditions/parameters at once on the monitor 18. These as well as required trouble codes may be requested from the OBD 22 at regular intervals as a batch for the purposes of displaying the operating conditions/parameters of the selected mode 36. The batch request may be either set by the manufacturer as the default setting, or may be set by the user (i.e., setting the operating conditions/parameters for the mode). However, requesting this amount of data from the OBD 22 as a single batch may require too much processing time of the OBD as discussed above. In this regard, instead of querying the complete batch at each interval, the gauge 10 may be limited to querying, at each interval, five PIDs (i.e., parameter identification) related to the operating conditions/parameters of the selected mode displayed on the monitor 18 and querying the trouble codes at every other interval. This works to lessen the burden placed on the OBD 22 by the gauge 10. Moreover, all five PIDs of the selected mode may not have to be queried at each interval but some may be queried at different intervals. For example, the gauge 10 may query the OBD 22 regarding the tachometer operating condition/parameter every second (i.e., one interval), and the gauge 10 may query the OBD 22 regarding the coolant temperature operating condition/parameter every 30 seconds (i.e., thirty intervals). This further reduces the amount of processing required by the OBD 22 to support the gauge. In this regard, the OBD 22 of the automobile 12 is transformed from a diagnostic system to a gauge 10 that may be used while the car is being driven.

Figure 18:
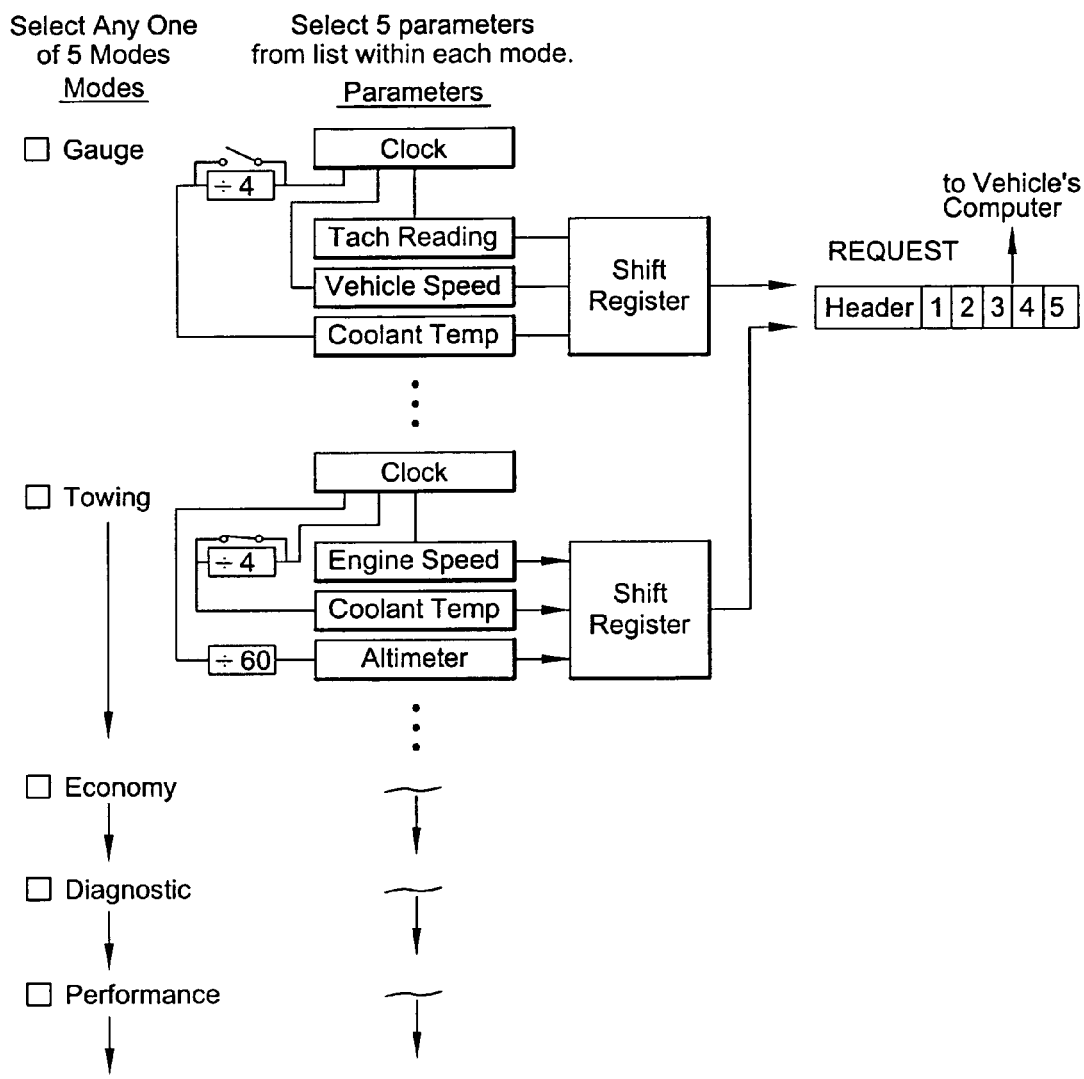
FIG. 18 is a schematic diagram illustrating requests being sent to the OBD, each request subsequent request being requesting different information based on function of the vehicle and requested operating condition.

Referring now to FIG. 18, the same illustrates the above described method. In particular, on the left hand side, five different modes 64 which are selectable by the user, namely the gauge mode, the towing mode, the economy mode, the diagnostic mode, and the performance mode are illustrated. Once a mode is selected by the user, then a plurality of operating conditions/parameters may be selected by the user, as shown in the parameters column 66. In this regard, the parameters column, by way of example and not limitation, illustrates only a partial list of operating conditions under some of the modes. The list is not meant to limit the scope of the present invention, rather it is meant to illustrate various aspects of the present invention which have been discussed and will be discussed.

The parameters column 66 additionally shows that each mode is associated with a clock 68, divide by factor 70, shift register 72 and a request 74 which ultimately is sent to the vehicle's computer. The selected mode, selected operating conditions, clock 68, divide by factor 70, shift register 72 and request 74 operate to send a request to the vehicle's computer at period intervals. For example, when the user selects the gauge mode, then the user is provided with a list of operating conditions to be monitored. The user then chooses five different operating conditions to be monitored when the instrument of the present invention is in use. For example, as shown in FIG. 18, if the user chooses tach reading, vehicle speed, and coolant temperature, then requests for data on these operating conditions are sent to the shift register 72 based on its divide by factor. In particular, tach reading and vehicle speed has a divide by factor of 1 and coolant temperature has a divide by factor of 4. In this regard, the requests for data on the tach reading and vehicle speed are sent to the shift register at a default rate which is the highest rate of communication between the vehicle's computer and the instrument of the present invention. And, the request for data on coolant temperature is sent to the shift register at every fourth request. This example illustrates that the first, second, and third requests to the vehicle's computer requests data on tach reading and vehicle speed; and the fourth request to the vehicle's computer requests data on tach reading, vehicle speed and coolant temperature. This method of dividing the requests for data on operating conditions is operative to reduce load on the processor of the vehicle's computer.

Further, the formulation of the series of requests discussed above may be based on the selected mode. In this regard, as shown in FIG. 18, coolant temperature has a divide by factor 70 of four (4) when this operating condition is selected under the gauge mode, however, when the coolant temperature is selected under the towing mode, then such operating condition is associated with a divide by factor 70 of one (1). This illustrates that the frequency of the request sent to the vehicle's computer for data on the coolant temperature may be based on the selected mode. In other words, when coolant temperature is selected under the gauge mode, a request for data on coolant temperature is sent to the vehicle's computer at fourth request, whereas when coolant temperature is selected under the towing mode, a request for data on the coolant temperature is sent to the vehicle's computer at every request. In practical terms, as discussed above, the various modes were formulated by the inventors based on function of the vehicle or driver's taste. As such, since the coolant temperature would be more relevant when the vehicle is towing a load compared to normal driving (i.e., gauge mode), requests for the coolant temperature is sent out more frequently when the vehicle is being used tow a load.

In another aspect of the present invention, as stated above, the gauge 10 has the capability of automatically identifying the y/m/m/e of the automobile to which the gauge 10 has been attached to. In particular, first, the gauge 10 may be programmed such that the gauge 10 requests the OBD 22 to notify the gauge 10 which protocol the gauge 10 is compliant with. This occurs when the connector 20 of the gauge 10 is attached to the mating connector 24 of the OBD 22. Accordingly, the computer of the gauge 10 may be equipped to communicate with the OBD 22 of the automobile 12 through all of the OBD protocols. By way of example and not limitations, the protocols for OBD II compliant vehicles may be ISO 9141, KWP2000, J1850 PWM, J1850 PM and CAN. Second, once the OBD 22 has notified the gauge 10 which protocol it is compliant with, the gauge 10 sends a request to the appropriate PID for the vehicle identification information, and the OBD 22 sends that data back to the gauge 10 for further processing.

The gauge 10, as stated above, comprises a computer. The computer is programmed such that the gauge 10 may operate as discussed above in relation to the communication between the gauge 10 and the OBD 22 and further in relation to the basic operation of the layered screens.

In another aspect of the present invention, the communication between the OBD 22 and the gauge 10 provides the gauge 10 with data about operating conditions/parameters of the vehicle 12. But also, it is contemplated that the gauge 10 may obtain data about the operating conditions/parameters of the vehicle 12 from the individual automobile component itself. For example, an engine speed of the automobile 12 may be picked up inductively (see FIG. 17) or through a hard wired connection with an ignition coil. If the engine speed is obtained inductively, then an inductive pick up 56 is placed about a spark plug wire 58 to detect the current pulses flowing through the spark plug wire 58. These detected current pulses are sent to the gauge 10 and processed to determine the engine speed. If the engine speed is obtained through a hard wired connection, then the current pulses are detected directly from the ignition coil. These detected current pulses are sent to the gauge 10 and processed to determine the engine speed. Regardless of whether the engine speed is picked up inductively or through a hard wired connection, the detected current pulses is transmitted to the gauge through a wire 60 (see FIG. 17). The distal end 62 of the wire 60 has a connector (not shown) which has a unique cable id. In this regard, when the connector is attached to the gauge 10, the gauge 10 is operative to identify the cable id to determine which operating condition/parameter is being sensed. In this example, the cable id may indicate to the gauge that engine speed is being sensed.

Figure 21A:
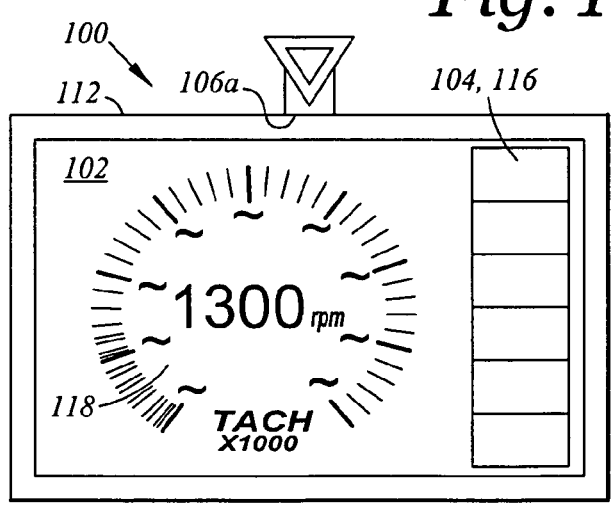
FIG. 21a illustrate secondary operating conditions aligned vertically and on a right hand side of a primary operating condition when the external light is engaged to a first receptacle.

In another aspect of the present invention, the serial data gauge 100 (see FIGS. 21a and 21b) may comprise a display 102, preferably a flat panel LCD, control buttons 104, data and power input ports and a data and power cable connectable to a vehicle's data and power output port and at least one warning light receptacle 106 and at least one external warning light 108 which may be plugged into the warning light receptacle 106.

Figure 19A:
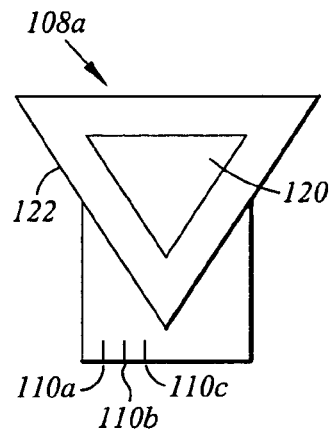
FIGS. 19a–e are front views of first through fifth external warning lights with respective first through fifth peripheral configurations and respective first through fifth unique pin configurations.
Figure 19B:
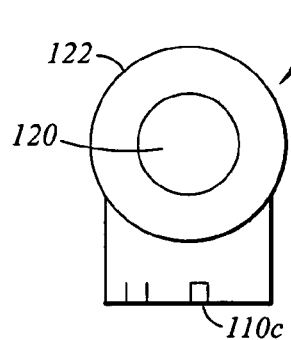
Figure 19C:
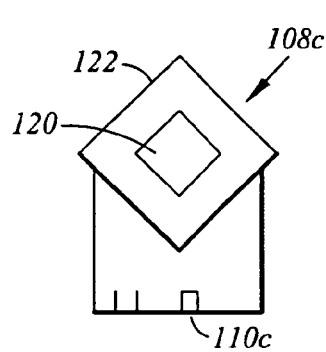
Figure 19D:
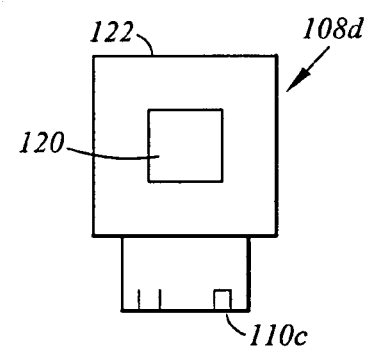
Figure 19E:
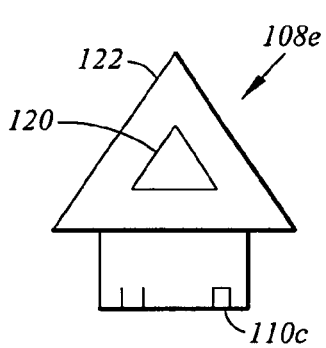
Figure 22:
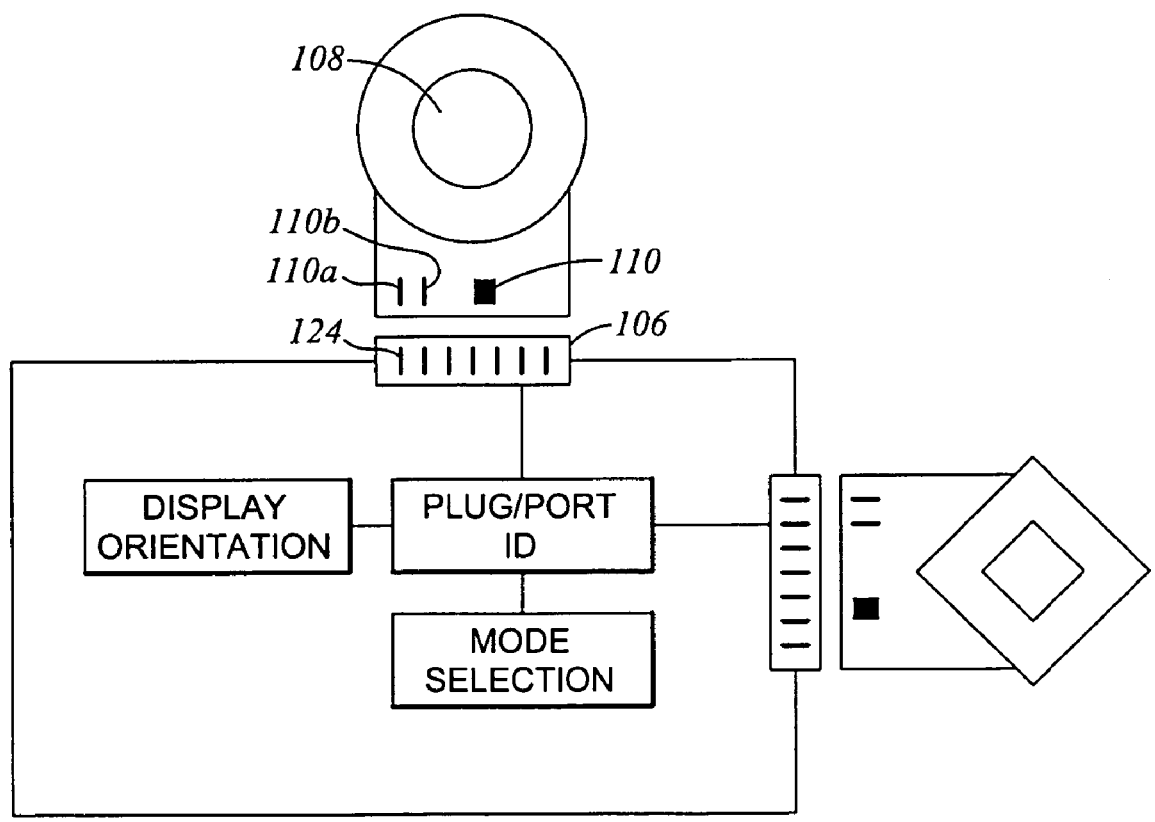
FIG. 22 is a circuit diagram of the external light engageable to the receptacle/port.

The external warning light 108 serves at least three functions, namely it changes or sets the serial data gauge mode, it provides a visual indication when an alarm threshold is exceeded by an operating condition of the vehicle, and reorients the display depending whether the external light is engaged to a first receptacle or second receptacle. The external warning light 106, as stated above, sets the mode of the serial data gauge 100 by way of a series of pin settings. As shown in FIGS. 19a–19e, in particular, on a lower end of the external warning light 108 are a series of pins 110. The first two pins 110a, b may be power and ground, respectively to provide power to the warning light 108 itself. A third pin 110c may be located adjacent to the power and ground pins 110a, b. The distance between the power and ground pins 110a, b with respect to the third pin 110c determines which mode the serial data gauge 100 will be set to once the external warning light 108 is engaged to the warning light receptacle 106. As shown in FIGS. 19a–19e, five different external warning lights 108a–e are shown. In particular, each successive Figure illustrate that pin three 110c is physically located further away from the power and ground pins 110a, b. The warning light receptacle 106 (see FIG. 22) may have eight pads 124, two of which are aligned with the power and ground pins 110a, b and the third pin 110c shown in FIGS. 19a–19e. In this regard, when the external warning light 108 engages the receptacle 106, the third pin's 110c physical location operates short circuit two pads 124 and send a signal to a processor of the serial data gauge 100 to select a mode/package. For example, inserting the external warning light 108 (see FIG. 22) into the warning light receptacle 106 of the serial data gauge contacts the first and second pads as well as the fifth and sixth pads of the receptacle 106. This sets the mode of the serial data gauge 100 to a towing package. Additionally, inserting the external warning light 108 as shown in FIG. 19b into the warning light receptacle 106 sets the mode of the serial data gauge 100 to the performance package because the pin 110c of the external warning light 108 contact the fourth and fifth pads of the receptacle 106. With each external warning light 108 shown in Figures c–e, inserting the warning light 108 into the receptacle 106 operates to set the mode of the serial data gauge 100 to the diagnostic package, gauge package, and economy package, respectively.

Each package listed above may provide a user to select five vehicle operating conditions to be displayed on the gauge display from a list of operating conditions most relevant to the corresponding package. The list of operating conditions selectable under each of the packages are listed in FIGS. 20a–20e.

Figure 21B:
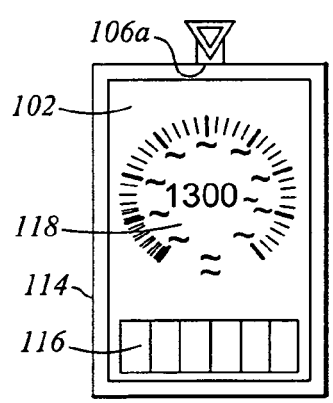
FIG. 21b illustrate secondary operating conditions aligned horizontally and on a bottom side of the primary condition when the external light is engage to a second receptacle.

Optionally, the serial data gauge 100 may further comprise a second external warning light receptacle 106b. The warning light receptacle 106a discussed above may be located on a longitudinal edge 112 of the display 102 such that it is readily visible to the driver or user of the serial data gauge 100. The second external warning light receptacle 106 may be located on an adjacent lateral edge 114 of the display 102. In this regard, inserting the external warning light 108 into the first receptacle 106a may be operative to orient the secondary operating conditions 116 vertically on the right hand side of the primary operating condition 118, and inserting the external warning light 108 into the second warning light receptacle 106 may be operative to orient the secondary operating conditions 116 horizontally underneath the primary operating condition 118 as shown in FIG. 21b.

The external warning light may have a light emitting diode 120 (see FIGS. 19a–e) or other colored light. The colored light may be coordinated to indicate the package which the gauge 100 is set to. The LED 120 functions to alert the driver that one of the displayed operating conditions may have exceeded its respective alarm threshold. A body periphery 122 of the light emitting diode 120 may have several different configurations with each different configuration representing a different package. By way of example and not limitation, the towing package may be represented by a triangular periphery (see FIG. 19a), the performance package may be represented by a circular periphery (see FIG. 19b), and the diagnostic package may be represented by a square periphery (see FIG. 19c). In this regard, the user does not have to read a label to determine which mode the serial data gauge 100 will be set to when the external warning light 108 is engaged to the warning light receptacle 106, rather the user need only visually inspect the configuration of the LED periphery 122 to determine which package the serial data gauge 100 will be set to upon engagement between the warning light 106 and the receptacle 108.

This description of the various embodiments of the present invention is presented to illustrate the preferred embodiments of the present invention, and other inventive concepts may be otherwise variously embodied and employed. The appended claims are intended to be construed to include such variations except insofar as limited by the prior art.

What is claimed is:

1. A gauge for a vehicle equipped with an on board diagnostic system (OBD), the gauge comprising a scan tool processor operative to frequently access the OBD to retrieve rapidly changeable vehicle operating conditions and to less frequently access the OBD to retrieve less rapidly changeable vehicle operating conditions to simulate continual monitoring of monitored vehicle operating conditions without exceeding processing limitations of the OBD.

2. The gauge of claim 1 wherein the rapidly changeable vehicle operating condition is vehicle speed and the less rapidly changeable vehicle operating condition is fuel level.

3. The gauge of claim 1 further comprising:
   a. a monitor in electronic communication with the OBD for receiving vehicle operating conditions data, the monitor being capable of simultaneously displaying data on at least two operating conditions of the vehicle; and
   b. different visual alarms simultaneously displayable on the monitor for the operating conditions that have exceeded an associated alarm threshold and are displayed on the monitor.

4. The gauge of claim 3 wherein at least one suggested remedial action is displayed on the monitor based on a combination of operating conditions that have exceeded the associated alarm threshold.

5. The gauge of claim 3 wherein at least one suggested remedial action is displayed on the monitor when at least one operating condition has exceeded the associated alarm threshold, the suggested remedial action being based on a combination of data collected on the operating condition which has exceeded the associated alarm threshold and on data on at least one other operating condition.

6. The gauge claim 3 wherein the operating conditions define a primary operating condition and the data on the remaining operating conditions define secondary operating conditions, the primary operating condition being displayed on the monitor in a larger format compared to the secondary operating conditions.

7. The gauge of claim 6 wherein depressing one of the secondary operating conditions is operative to change the depressed secondary operating condition into the primary operating condition.

8. An instrument for a vehicle equipped with an on board diagnostic system (OBD), the instrument comprising:
   a. a monitor in electronic communication with the OBD for receiving vehicle operating conditions data, the monitor having displayed thereon data on at least two operating conditions of the vehicle received from the OBD;
   b. at least some of the operating conditions being associated with an alarm threshold and a different visual alarm is displayed for each operating condition that has exceeded the associated alarm threshold;
   c. a first port located on a longitudinal edge of the monitor;
   d. a second port located on a lateral edge of the monitor; and
   e. wherein the visual alarm is an external warning light engageable with either the first or second port wherein engagement of the light with the first port displays the vehicle operating conditions data horizontally and engagement of the light with the second port displays the vehicle operating conditions data vertically.

9. An instrument for a vehicle equipped with an on board diagnostic system (OBD), the instrument comprising:
   a. a monitor in electronic communication with the OBD for receiving vehicle operating conditions data, the monitor having displayed thereon data on at least two operating conditions of the vehicle received from the OBD;
   b. at least some of the operating conditions being associated with an alarm threshold and a different visual alarm is displayed for each operating condition that has exceeded the associated alarm threshold;
   c. a port attached to the monitor; and
   d. wherein the visual alarm is an external warning light engageable with the port, the light having a pin uniquely positioned to contact respective pads of the port for setting a mode of the instrument.

10. A method of transforming a device communicable with an on board computer diagnostic system (OBD) into a real time gauge without exceeding the processing limitations of the OBD, the method comprising the steps of:
    a. providing a set of first and second vehicle operating conditions, the first vehicle operating conditions being more rapidly changeable then the second vehicle operating conditions;
    b. requesting information concerning first vehicle operating conditions from the OBD at a first rate; and
    c. requesting information concerning second vehicle operating conditions from the OBD at a second rate, the first rate being more frequent then the second rate.

11. The method as recited in claim 10 further comprising the step of changing at least one of the first and second request rates in response to variations and the rate of change of vehicle operating conditions due to the vehicle being operated in alternate modes.

12. The method as recited in claim 10 wherein the first request rate is a multiple of the second request rate.

13. The method as recited in claim 10 further comprising the step of repeating the requests for information concerning first and second vehicle operating conditions on an ongoing basis.

14. The method as recited in claim 13 wherein the step of requesting information concerning second vehicle operating conditions occurs substantially simultaneous with at least one of the steps of requesting information concerning first vehicle operating conditions.

* * * * *